United States Patent
Kato

(10) Patent No.: US 10,445,233 B2
(45) Date of Patent: Oct. 15, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kensuke Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 14/745,215

(22) Filed: Jun. 19, 2015

(65) Prior Publication Data
US 2015/0370704 A1    Dec. 24, 2015

(30) Foreign Application Priority Data

Jun. 23, 2014  (JP) .................................. 2014-128622
Jun. 23, 2014  (JP) .................................. 2014-128624

(51) Int. Cl.
*H04L 29/06*     (2006.01)
*G06F 12/06*     (2006.01)
*G06F 21/79*     (2013.01)

(52) U.S. Cl.
CPC .......... *G06F 12/0638* (2013.01); *G06F 21/79* (2013.01); *G06F 2212/205* (2013.01)

(58) Field of Classification Search
CPC .................................. H04L 12/00; G06F 9/00
See application file for complete search history.

(56) References Cited

U.S. PATENT DOCUMENTS

| | | | | |
|---|---|---|---|---|
| 5,903,646 A | * | 5/1999 | Rackman | G06F 21/6218 380/54 |
| 2007/0294496 A1 | * | 12/2007 | Goss | G06F 12/1408 711/163 |
| 2009/0077096 A1 | * | 3/2009 | Ohama | G06F 21/575 |
| 2012/0289194 A1 | * | 11/2012 | Uchida | H04M 1/274516 455/410 |

FOREIGN PATENT DOCUMENTS

| | | |
|---|---|---|
| JP | 2004362426 A | 12/2004 |
| JP | 2005158043 A | 6/2005 |
| JP | 2007249951 A | 9/2007 |
| JP | 2008-204507 A | 9/2008 |
| JP | 2012-168737 A | 9/2012 |
| JP | 2012231380 A | 11/2012 |
| JP | 2013004036 A | 1/2013 |

* cited by examiner

*Primary Examiner* — Edward Zee
*Assistant Examiner* — Leynna T Truvan
(74) *Attorney, Agent, or Firm* — Canon U.S.A., Inc. IP Division

(57) ABSTRACT

An information processing apparatus for processing data using a main memory device and a nonvolatile secondary storage device includes a nonvolatile main memory unit, a volatile main memory unit, a determination unit that determines whether the data is designated as confidential data, and a control unit that stores the data in the volatile main memory unit if the determination unit determines that the data is designated as confidential data and stores the data in the nonvolatile main memory unit if the determination unit determines that the data is not designated as confidential data.

16 Claims, 15 Drawing Sheets

INFORMATION PROCESSING APPARATUS, INFORMATION PROCESSING METHOD, AND STORAGE MEDIUM

BACKGROUND

Field

Aspects of the present disclosure generally relate to an information processing apparatus including a nonvolatile main memory unit.

Description of the Related Art

Nonvolatile memories that allow a high speed read and write access have been in practical use. Such memories can be included in information processing apparatuses, such as personal computers, to serve as a main memory unit. Examples of a nonvolatile main memory unit include a magnetoresistive random access memory (MRAM), a ferroelectric random access memory (FeRAM), a resistance random access memory (ReRAM), and a phase change random access memory (PRAM).

Nonvolatile main memory units can continuously maintain data without continuous power supplied to the memory units. Accordingly, unlike information processing apparatuses including a volatile main memory unit, the power consumption of information processing apparatuses including a nonvolatile main memory unit is substantially zero when the information processing apparatus is in a suspended mode.

In addition, since the information processing apparatuses can retain a computer program in the nonvolatile main memory unit at all times, the information processing apparatuses need not load the computer program before executing the computer program. Thus, a start-up time of the information processing apparatuses can be reduced.

On the down side, it is difficult to prevent the stored information from leaking out of the information processing apparatus including a nonvolatile main memory unit.

That is, the information stored in the main memory unit is simply lost when power supplied to information processing apparatuses including a volatile main memory unit, such as a dynamic random access memory (DRAM), is stopped.

In contrast, even when power supplied to information processing apparatuses including a nonvolatile main memory unit is stopped, information stored in the main memory unit is continuously retained. Accordingly, after power supply is stopped, the main memory unit that retains the information can be physically removed from the information processing apparatus.

That is, information processing apparatuses including a nonvolatile main memory unit are at high risk of leaking information stored therein if the main memory unit is removed.

In particular, widely-used operating systems have a memory management mechanism to efficiently use the memory space. The processing performed by the memory management mechanism may cause leaking of the information. For example, the memory management mechanism of Linux™ may automatically copy data from one storage device to another storage device even when a user or a user program does not instruct the copying operation.

That is, even when the user does not explicitly instructs a computer, confidential information may be stored in the nonvolatile main memory unit.

To prevent the above-described leaking of information, the information stored in the main memory unit can be encrypted. Japanese Patent Laid-Open No. 2008-204507 describes a technology for preventing leaking of information out of an information processing apparatus including a RAM. According to the technology described in Japanese Patent Laid-Open No. 2008-204507, data encrypted using scramble information is stored in an MRAM. The encrypted data cannot be decrypted unless the key information for decryption is available.

On the down side, in the technology described in Japanese Patent Laid-Open No. 2008-204507, a mechanism for performing a scramble process and a descramble process is required. Accordingly, the data in the MRAM cannot be directly used and, thus, the processing speed of reading and writing data may decrease.

In addition, Japanese Patent Laid-Open No. 2012-168737 describes an information processing apparatus including a volatile memory unit and a nonvolatile memory unit to prevent leaking of information. More specifically, to prevent leaking of information, some of data are stored in the volatile memory unit. In this manner, although the data stored in the nonvolatile memory unit may be leaked out, all the data are not leaked out, since some of the data are stored in the volatile memory unit. According to the technology described in Japanese Patent Laid-Open No. 2012-168737, the data stored in the memory units are not encrypted. Accordingly, the processing speed negligibly decreases.

However, there is a risk of leaking out some of the data. That is, according to the technology described in Japanese Patent Laid-Open No. 2012-168737, the protection is not always perfect.

SUMMARY

Aspects of the present disclosure provide an information processing apparatus including a nonvolatile main memory unit capable of preventing leaking of confidential data while preventing a decrease in the processing speed in reading and writing of data.

According to an aspect of the present disclosure, an information processing apparatus for processing data using a main memory device and a nonvolatile secondary storage device includes a nonvolatile main memory unit, a volatile main memory unit, a determination unit configured to determine whether the data is designated as confidential data, and a control unit configured to store the data in the volatile main memory unit if the determination unit determines that the data is designated as confidential data and store the data in the nonvolatile main memory unit if the determination unit determines that the data is not designated as confidential data.

Further features of the present disclosure will become apparent from the following description of exemplary embodiments with reference to the attached drawings.

DESCRIPTION OF THE EMBODIMENTS

First Exemplary Embodiment

Figure 1:
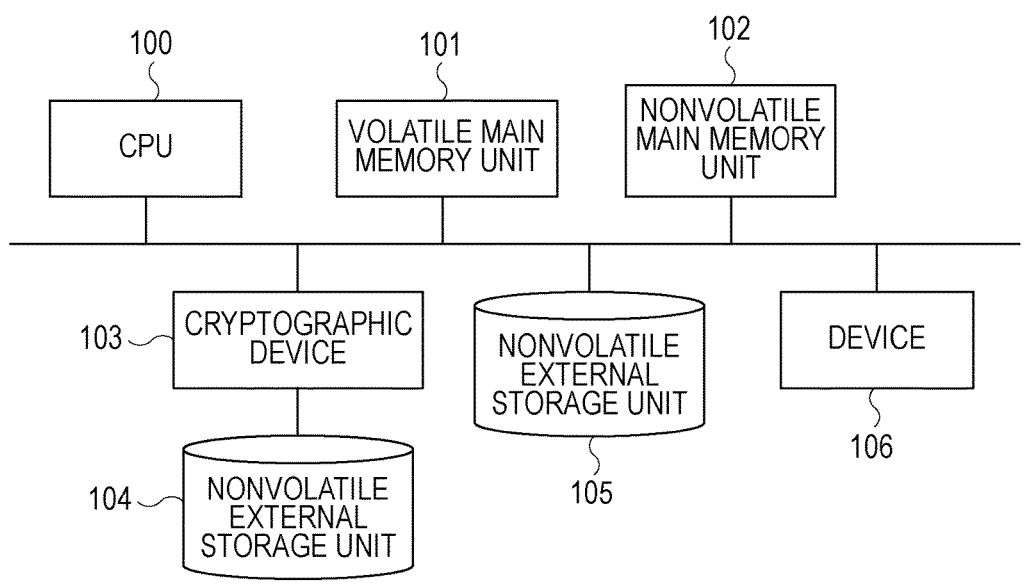
FIG. 1 is a schematic illustration of the configuration of an information processing apparatus according to a first exemplary embodiment.

FIG. 1 is a schematic illustration of the configuration of an information processing apparatus according to a first exemplary embodiment.

The information processing apparatus according to the present exemplary embodiment includes a central processing unit (CPU) 100 for controlling constituent elements of the information processing apparatus.

The information processing apparatus further includes a volatile main memory unit 101 serving as a main memory device. The volatile main memory unit 101 is capable of storing, for example, a computer program and a variety of data. A particular example of the volatile main memory unit 101 is a dynamic random access memory (DRAM). The volatile main memory unit 101 can retain data as long as power is supplied thereto. In contrast, if no power is supplied, the data is lost.

The information processing apparatus further includes a nonvolatile main memory unit 102 serving as the main memory device. Like the volatile main memory unit 101, the nonvolatile main memory unit 102 can store computer a program and a variety of data. The data stored in the volatile main memory unit 101 is lost if no power is supplied thereto. In contrast, the nonvolatile main memory unit 102 can retain data even when no power is supplied thereto. Particular examples of the nonvolatile main memory unit 102 include a magnetoresistive random access memory (MRAM), a ferroelectric random access memory (FeRAM), a resistance random access memory (ReRAM), and a phase change random access memory (PRAM).

The information processing apparatus further includes a cryptographic device 103 mounted in a nonvolatile external storage unit 104 (described in more detail below). The cryptographic device 103 encrypts and decrypts data input to and output from the nonvolatile external storage unit 104. Note that the cryptographic device 103 may be mounted in the nonvolatile external storage unit 104 in an integrated manner.

The nonvolatile external storage unit 104 can store a computer program and a variety of data. The nonvolatile external storage unit 104 functions as a secondary storage device. Examples of the nonvolatile external storage unit 104 include a hard disk drive (HDD) and a solid state drive (SSD).

The information processing apparatus further includes a nonvolatile external storage unit 105. Like the nonvolatile external storage unit 104, the nonvolatile external storage unit 105 can store a computer program and a variety of data. The nonvolatile external storage unit 104 has the cryptographic device 103 mounted therein. In contrast, the nonvolatile external storage unit 105 does not have an encryption device mounted therein.

The information processing apparatus further includes a device 106 serving as a peripheral device that is initialized by the CPU 100. Examples of the device 106 include a variety of devices, such as a PCI-connected graphic board, a USB-connected scanner and a USB-connected printer. Note that the device 106 may be formed by a plurality of peripheral devices.

When the system is started up, a boot loader loads an operating system into the nonvolatile main memory unit 102. The operating system performs an initialization process on the operating system itself using an area of the nonvolatile main memory unit 102. In addition, the operating system enables a computer program to use the volatile main memory unit 101 and the nonvolatile main memory unit 102.

After the system is started up, the following processes are performed to execute a computer program. That is, the CPU 100 loads the computer program stored in the nonvolatile external storage unit 104 or the nonvolatile external storage unit 105 into the volatile main memory unit 101 or the nonvolatile main memory unit 102.

Note that if the computer program has already been loaded into the nonvolatile main memory unit 102, the need for the above-described loading process may be eliminated. The CPU 100 fetches, from the volatile main memory unit 101 or the nonvolatile main memory unit 102, instructions of the computer program and performs a process.

Figure 2:
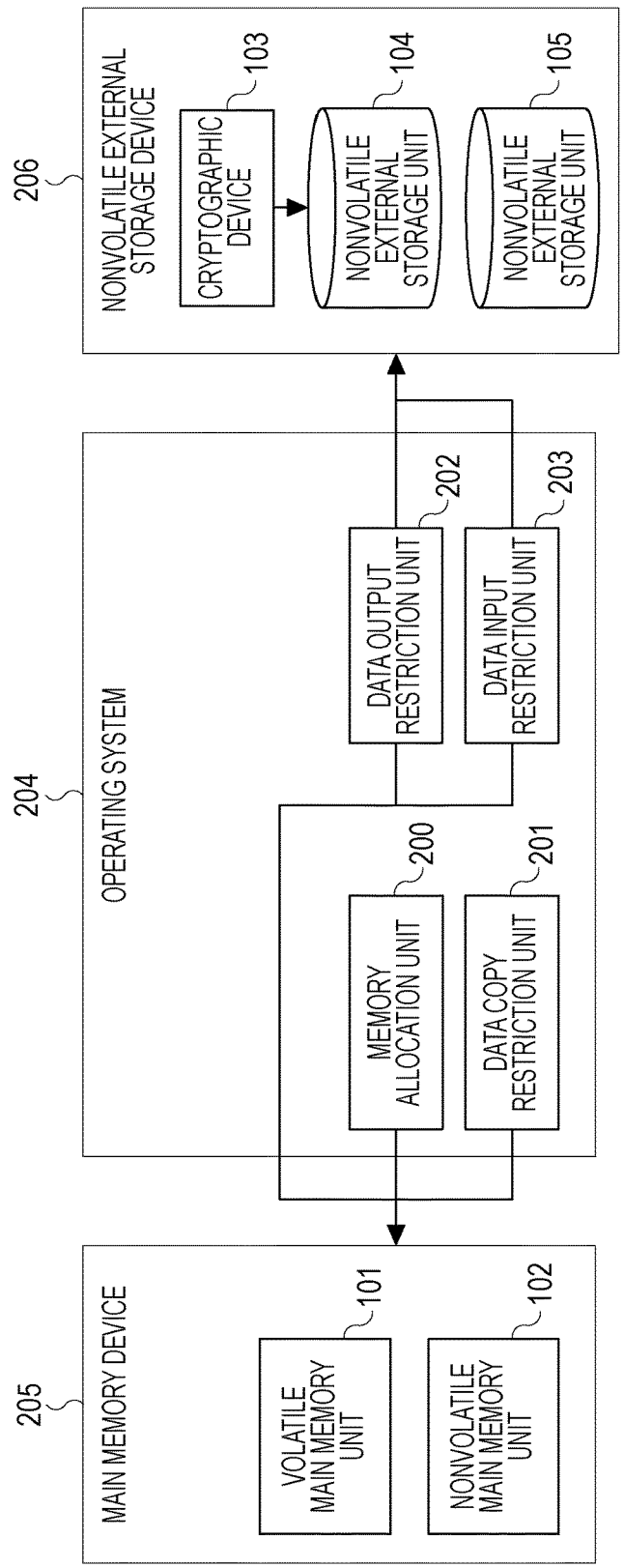
FIG. 2 illustrates the configuration of a memory management mechanism of the information processing apparatus according to the first exemplary embodiment.

FIG. 2 illustrates the configuration of a memory management mechanism of the information processing apparatus according to the present exemplary embodiment.

As illustrated in FIG. 2, according to the present exemplary embodiment, the memory management mechanism includes a memory allocation unit 200, a data copy restriction unit 201, a data output restriction unit 202, and a data input restriction unit 203. Note that these elements of the memory management mechanism are formed by the control performed by the operating system 204 and perform a memory management of the information processing apparatus. More specifically, the memory allocation unit 200 performs a memory allocation process, such as demand paging. The data copy restriction unit 201 performs, for example, a memory copy process, which is included in a copy-on-write mechanism. The data output restriction unit 202 performs a data output process, such data outputting based on swap-out. The data input restriction unit 203 performs, for example, a cache input process.

As illustrated in FIG. 2, a main memory device 205 includes the volatile main memory unit 101 and the nonvolatile main memory unit 102 illustrated in FIG. 1. A nonvolatile external storage device 206 includes the cryptographic device 103, the nonvolatile external storage unit 104, and the nonvolatile external storage unit 105 illustrated in FIG. 1.

Each of the elements of the memory management mechanism receives a request from the operating system 204 and accesses the main memory device 205. In this manner, the elements use the volatile main memory unit 101 and the nonvolatile main memory unit 102 included in the main memory device 205.

The data output restriction unit 202 and the data input restriction unit 203 access the nonvolatile external storage device 206 via the cryptographic device 103. Alternatively, the data output restriction unit 202 and the data input restriction unit 203 directly access the nonvolatile external storage device 206. A plurality of the nonvolatile external storage devices 206 or only one nonvolatile external storage device 206 may be provided.

The process performed by each of the elements of the memory management mechanism is described below with reference to FIGS. 3 to 6.

Figure 3:
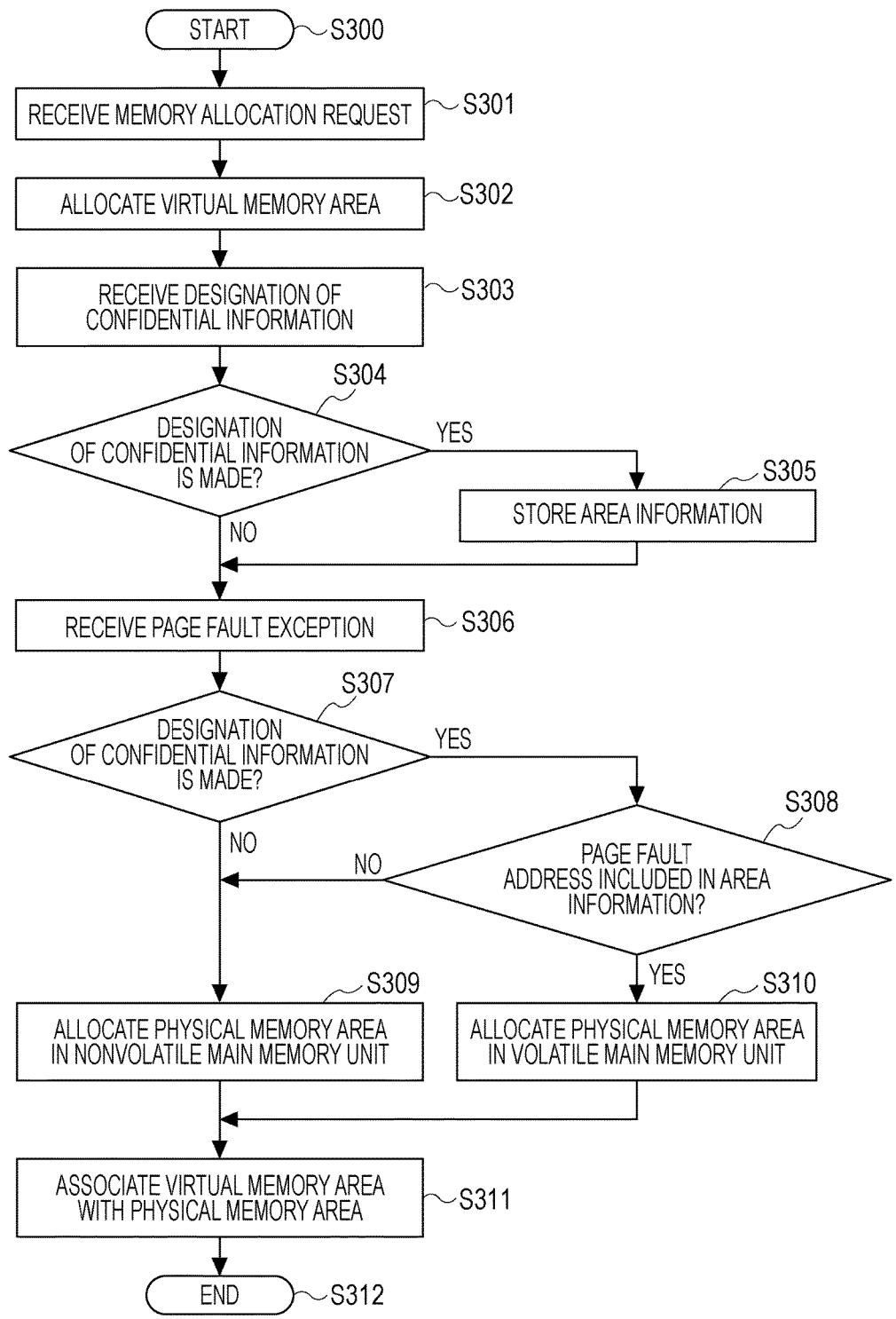
FIG. 3 is a flowchart of the process performed by a memory allocation unit according to the first exemplary embodiment.

FIG. 3 is a flowchart of the process performed by the memory allocation unit 200 according to the present exemplary embodiment and is also a flowchart of a memory allocation process based on demand paging according to the present exemplary embodiment. The steps of the process are described in detail below.

(step S300) The processing starts with this step.

(step S301) In step S301, the memory allocation unit 200 detects that a user or a user program submits a memory allocation request using a system call. The memory allocation unit 200 receives the memory allocation request via the operating system 204.

(step S302) In step S302, the memory allocation unit 200 allocates a memory area in a virtual memory on the basis of the memory allocation request submitted in step S301.

(step S303) In step S303, the memory allocation unit 200 receives, from the user or a user program, designation of confidential information on the basis of a system call. The system call is a request for allocating a virtual memory area as a confidential data area and is received from the operating system 204. Note that to designate information as confidential information, part of the virtual memory area may be allocated as a confidential data area or the entire virtual memory area may be allocated. In addition, the system call may be integrated with the system call used in step S301.

(step S304) In step S304, the memory allocation unit 200 functions as a determination unit. The memory allocation unit 200 determines whether, in step S303, designation of confidential information is made. If it is determined that designation of confidential information is made, the processing proceeds to step S305. However, if it is determined that no designation of confidential information is made, the processing proceeds to step S306.

(step S305) In step S305, the memory allocation unit 200 stores confidential area information in the main memory device 205.

(step S306) In step S306, the memory allocation unit 200 accepts receipt of a page fault exception. If data is written to the area allocated to the user or the user program, the memory allocation unit 200 receives a page fault exception from the CPU 100.

(step S307) In step S307, the memory allocation unit 200 functions as a control unit and determines whether, in step S304, designation of the confidential information is made. If it is determined that designation of confidential information is made, the processing proceeds to step S308. However, if it is determined that designation of confidential information is not made, the processing proceeds to step S309.

(step S308) In step S308, it is determined whether the virtual memory address which is a target of a page fault exception is included in the confidential area information stored in the main memory device 205. If it is determined that the virtual memory address which causes a page fault exception is included in the confidential area information, the processing proceeds to step S310. However, if it is determined that a virtual memory address which causes a page fault exception is not included in the confidential area information, the processing proceeds to step S309.

(step S309) In step S309, the memory allocation unit 200 determines whether sufficient memory capacity is available in the nonvolatile main memory unit 102 and, thereafter, allocates a physical memory area. After the physical memory area is allocated, the processing proceeds to step S311. Note that in the process performed in this step, to select one of the main memory units in which the memory area is to be allocated, the data transfer speeds of the main memory units may be taken into account in addition to the information as to whether sufficient memory capacity is available in the main memory units.

(step S310) In step S310, the memory allocation unit 200 allocates a physical memory area in the volatile main memory unit 101 as a confidential data area. If sufficient memory capacity is available, the processing proceeds to step S311 after the physical memory area is allocated.

(step S311) In step S311, the memory allocation unit 200 associates the virtual memory address with the allocated physical memory address.

(step S312) In step S312, the processing is completed.

Note that in the above-described step S310, the memory allocation unit 200 may directly receive, from the operating system 204, a request for allocating a physical memory area for confidential information and allocate a physical memory area in the volatile main memory unit 101.

In addition, even when a memory area has already been allocated for normal data, the memory allocation unit 200 can receive a request for re-allocating the memory area as a confidential data memory area.

In such a case, the memory allocation unit 200 functions as a setting unit that sets a confidential memory area.

The user or the user program designates, as a confidential memory area, a virtual memory area having an allocated physical memory area using a system call first. If the allocated physical memory area corresponding to the designated virtual memory area is in the nonvolatile main memory unit 102, the memory allocation unit 200 allocates a physical memory area in the volatile main memory unit 101 instead of the physical memory area allocated in the nonvolatile main memory unit 102. Thereafter, the memory allocation unit 200 copies the data in the original physical memory area to the new allocated memory area and changes the association so that the virtual memory area is associated with the new physical memory area. If the original memory area is not associated with another virtual memory area, the memory allocation unit 200 releases the original physical memory area. If the data is data obtained by decrypting encrypted data, the control may be performed so that the data is stored in the volatile main memory unit 101. As described above, the memory allocation unit 200 performs the process.

Figure 4:
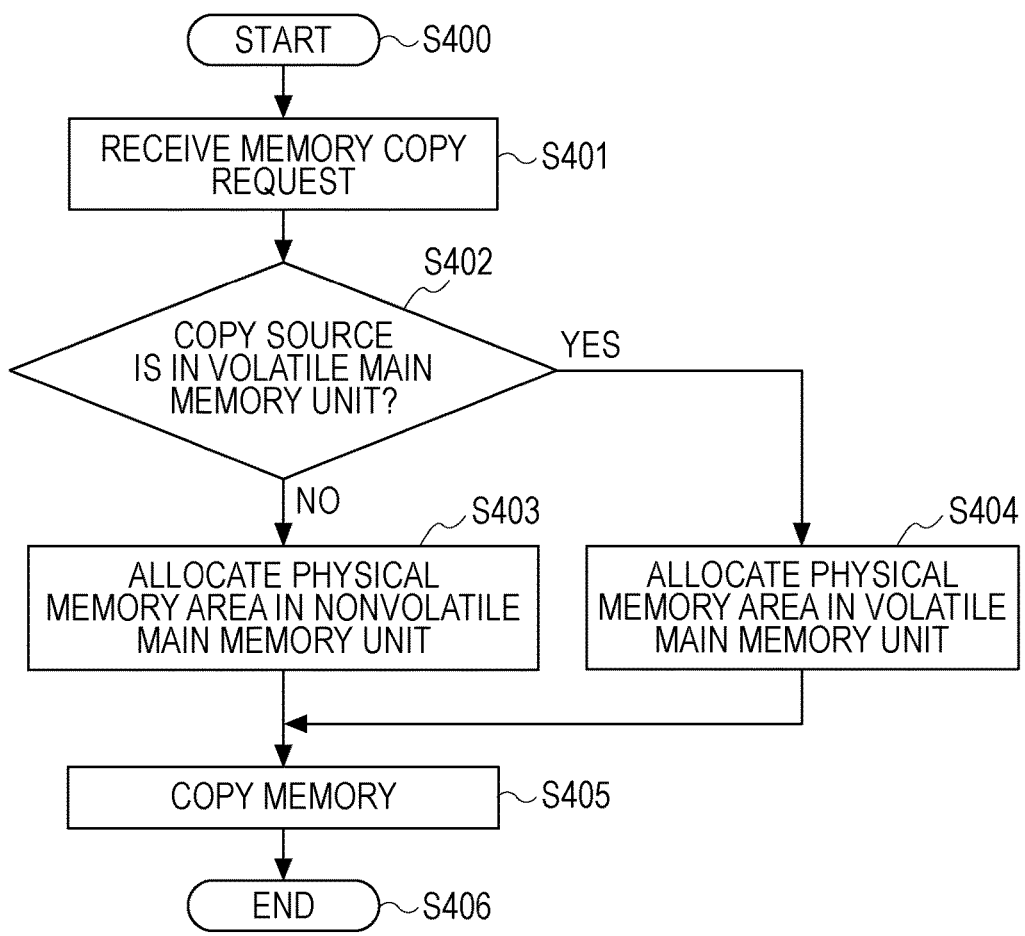
FIG. 4 is a flowchart of the process performed by a data copy restriction unit according to the first exemplary embodiment.

FIG. 4 is a flowchart of the process performed by the data copy restriction unit 201 according to the present exemplary embodiment and is also a flowchart of a memory copy process included in, for example, a copy-on-write mechanism according to the present exemplary embodiment. The steps of the flowchart are described in detail below.

(step S400) The processing starts with this step.

(step S401) In step S401, the data copy restriction unit 201 receives, from the operating system 204, a memory copy request for copying data in the main memory device 205.

(step S402) In step S402, it is determined whether the physical memory address of the data to be copied is an address in the volatile main memory unit 101. If, in step S402, it is determined that the physical memory address of the data to be copied is an address in the volatile main memory unit 101, the processing proceeds to step S404. However, if it is determined that the physical memory address of the data to be copied is not an address in the volatile main memory unit 101, that is, if the physical memory address of the data to be copied is an address in the nonvolatile main memory unit 102, the processing proceeds to step S403.

(step S403) In step S403, the data copy restriction unit 201 allocates a physical memory area in the nonvolatile main memory unit 102.

(step S404) In step S404, the data copy restriction unit 201 allocates a physical memory area in the volatile main memory unit 101.

(step S405) In step S405, the data copy restriction unit 201 copies the data to be copied from the original physical memory into the new allocated physical memory area.

(step S406) In step S406, the processing is completed.

Through the above-described processing, the data copy restriction unit 201 restricts copying data from one type of main memory unit to a different type of main memory unit. In this manner, confidential data and normal data do not coexist in the same main memory unit.

Note that in addition to the memory copy process, the data copy restriction unit 201 may perform a transfer process and a merge process in the main memory units of the same type. As used herein, the term "merge process" refers to a process in which if physical memory areas containing the same data are present, one of the physical memory area is left unchanged and the other physical memory area is released. According to the present exemplary embodiment, the data copy restriction unit 201 does not perform the merge process if two memory areas contain the same data but are located in main memory units of different types.

Figure 5:
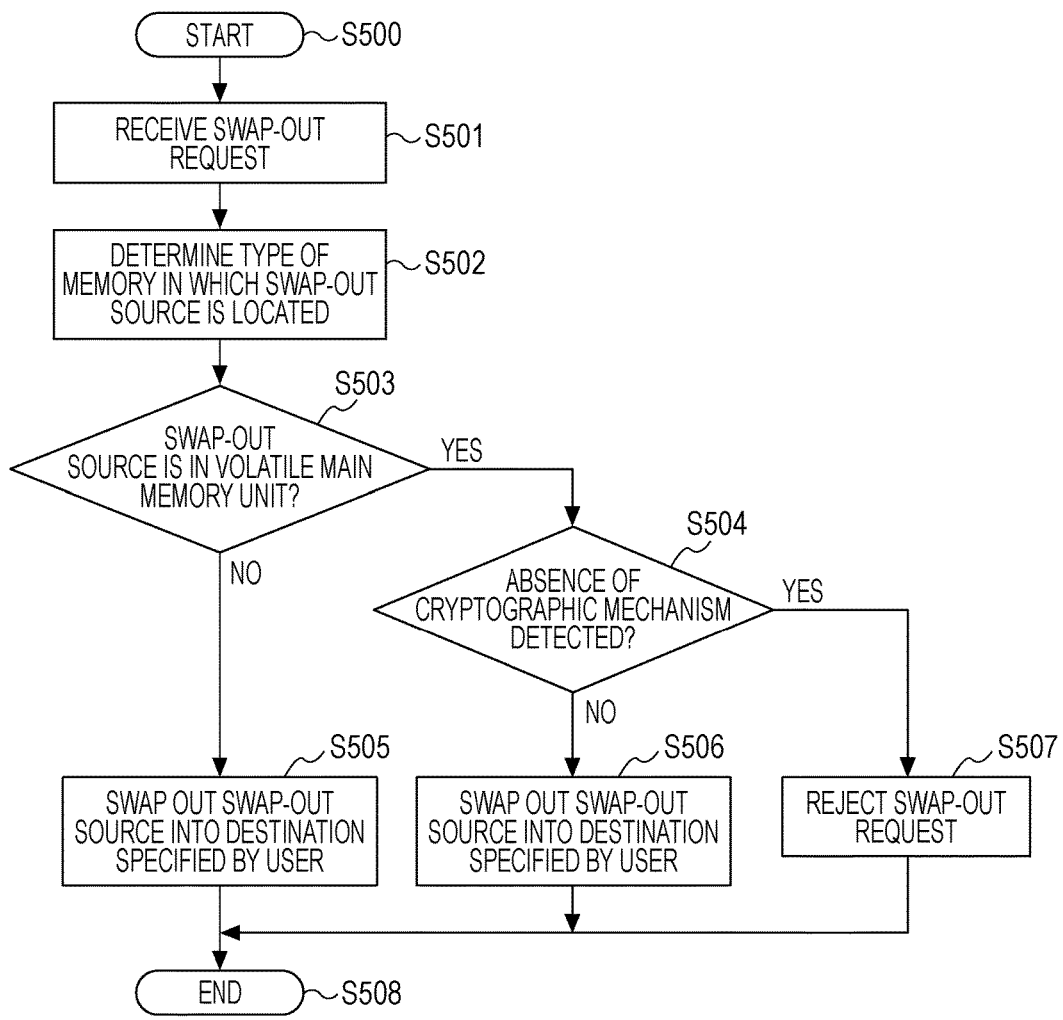
FIG. 5 is a flowchart of the process performed by a data output restriction unit according to the first exemplary embodiment.

FIG. 5 is a flowchart of the process performed by the data output restriction unit 202 according to the present exemplary embodiment and is also a flowchart of the data output process in swap-out. The steps of the flowchart are described in detail below.

(step S500) The processing starts with this step.

(step S501) In step S501, the data output restriction unit 202 receives a swap-out request from the operating system 204.

(step S502) In step S502, the data output restriction unit 202 determines in which one of the volatile main memory unit 101 and the nonvolatile main memory unit 102 the physical memory address of the data to be swapped out is located.

(step S503) In step S503, if it is determined that the data to be swapped out is located in the nonvolatile main memory unit 102, it is determined that swap-out is permitted and, thus, the processing proceeds to step S505. However, if it is determined that the data to be swapped out is located in the volatile main memory unit 101, the processing proceeds to step S504.

(step S504) In step S504, it is determined whether a cryptographic mechanism is provided. If it is determined that a cryptographic mechanism is not provided, the processing proceeds to step S507. However, if it is determined that the cryptographic mechanism is provided, the processing proceeds to step S506.

(step S505) In step S505, the data output restriction unit 202 swaps out the data to a swap-out destination in the nonvolatile main memory unit 102 specified by the user or a user program in advance.

(step S506) In step S506, the data output restriction unit 202 swaps out the data to a swap-out destination in the volatile main memory unit 101 specified by the user or a user program in advance.

(step S507) In step S507, the data output restriction unit 202 rejects the swap-out request received from the operating system 204.

(step S508) In step S508, the processing is completed.

Through the above-described processing, the data output restriction unit 202 restricts outputting data due to swap-out and, thus, prevents leaking of the confidential data stored in the volatile main memory unit 101.

Note that even when in step S504, it is determined that a cryptographic mechanism is not provided, the processing may proceed to step S506 if the data to be swapped out has already been encrypted by the user or the user program. If in step S504, it is determined that a cryptographic mechanism is not provided and the data to be swapped out is not encrypted, the processing may proceed to step S507.

In addition, the configuration and settings of the nonvolatile external storage device 206 may be dynamically changed. Thus, according to the present exemplary embodiment, the operating system 204 may acquire the information again when the configuration and settings of the nonvolatile external storage device 206 are changed. That is, when the configuration and settings of the nonvolatile external storage device 206 are changed, the operating system 204 acquires the information as to whether the cryptographic device 103 is provided in each of the nonvolatile external storage unit 104 and the nonvolatile external storage unit 105 again. Alternatively, the operating system 204 may acquire the information as to whether the data is encrypted by the operating system 204 again. The acquired information is stored in the main memory device 205.

In addition, according to the present exemplary embodiment, the operating system 204 may stop accepting an instruction to make a swap-out destination in the volatile main memory unit 101 and a swap-out destination in the nonvolatile main memory unit 102 be in the same swap partition. This is because if the data is swapped out into the same swap partition, the information regarding the memory unit including the data to be swapped out is lost and, thus, the data cannot be swapped in to a main memory unit having a type the same as the type of the memory unit including the data to be swapped out.

In addition, when normal data is written to the nonvolatile external storage device 206, the operating system 204 may temporarily cache the data into the main memory device 205 to output the data so that the data has a predetermined data size. At that time, the data output restriction unit 202 may also restrict the cache output process. When the data in the nonvolatile main memory unit 102 is temporarily cached, the data output restriction unit 202 allocates a cache in only the volatile main memory unit 101 and outputs the data to the cache. Thereafter, the data output restriction unit 202 outputs the data from the cache to the nonvolatile external storage device 206.

Through the above-described processing, leaking of confidential data from the volatile main memory unit 101 can be prevented.

Figure 6:
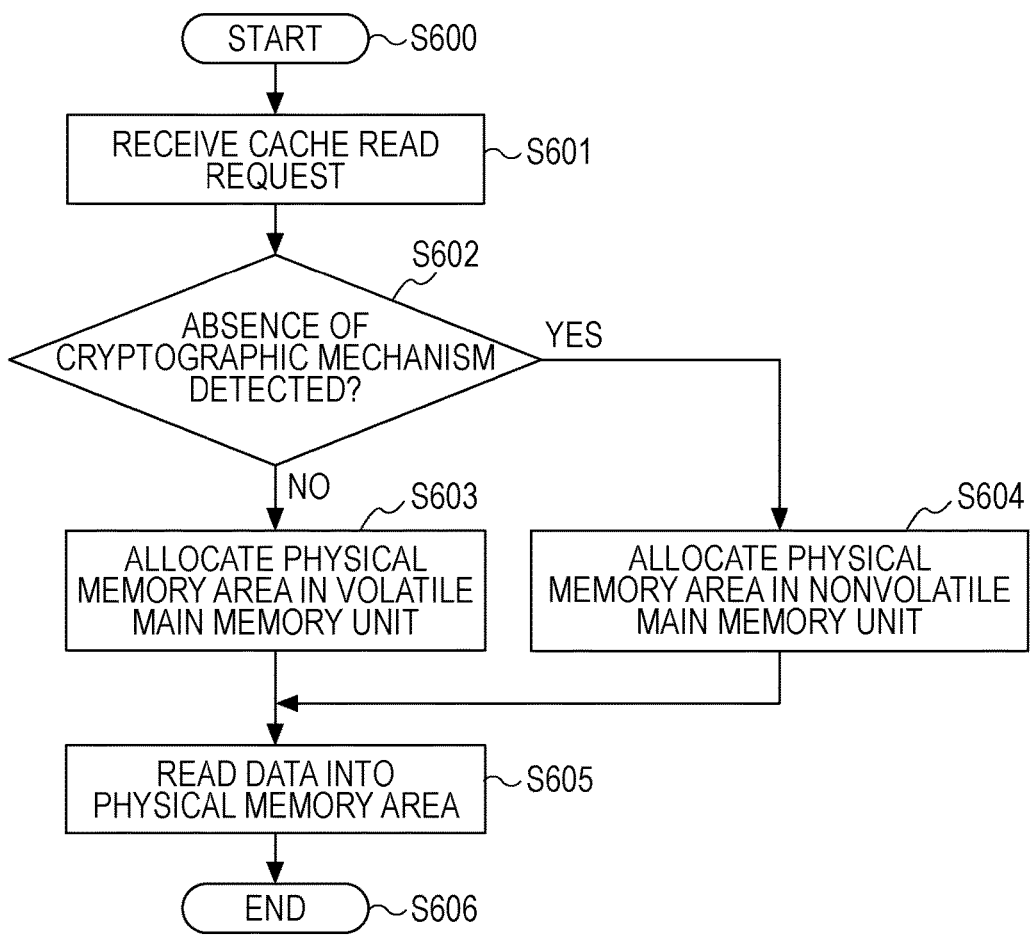
FIG. 6 is a flowchart of the process performed by a data input restriction unit according to the first exemplary embodiment.

FIG. 6 is a flowchart of the process performed by the data input restriction unit 203 according to the present exemplary embodiment and is also a flowchart of the cache input process performed by the nonvolatile external storage device 206. The steps of the flowchart are described in detail below.

(step S600) The processing starts with this step.

(step S601) In step S601, the data input restriction unit 203 receives, from the operating system 204, a request for reading the data in the nonvolatile external storage device 206 in the form of a cache.

(step S602) In step S602, it is determined whether a cryptographic mechanism is provided in the nonvolatile external storage device 206, from which the data is to be read. If it is determined that a cryptographic mechanism is not provided, the processing proceeds to step S604. However, if it is determined that a cryptographic mechanism is provided, the processing proceeds to step S603.

(step S603) In step S603, the data input restriction unit 203 allocates a physical memory area in the volatile main memory unit 101.

(step S604) In step S604, the data input restriction unit 203 allocates a physical memory area in the nonvolatile main memory unit 102.

(step S605) In step S605, the data input restriction unit 203 reads the data in the nonvolatile external storage device 206, from which the data is to be read, into the allocated physical memory area to generate a cache.

(step S606) In step S606, the processing is completed.

Note that the data input restriction unit 203 may control the swap-in process. The data input restriction unit 203 performs swap-in in the following manner. That is, the data input restriction unit 203 reads the information regarding the swap-out destination specified by the user or the user program and allocates a physical memory area in one of the volatile main memory unit 101 and the nonvolatile main memory unit 102 that is the main memory device 205 from which the data was swapped out. Thereafter, the data input restriction unit 203 inputs the swapped-out data in the volatile main memory unit 101 into the allocated physical memory area. In this manner, the data-in process is performed.

In addition, when the information processing apparatus enters a suspended mode, the operating system 204 swaps out all the data in the volatile main memory unit 101 into the nonvolatile external storage device 206. When the information processing apparatus resumes from the suspended mode, the operating system 204 swaps in the data from the nonvolatile external storage device 206 into the volatile main memory unit 101. Alternatively, when a page is requested, the data is read from the nonvolatile external storage device 206 into the volatile main memory unit 101. In this manner, even when the information processing apparatus is suspended with the power turned off, the data in the volatile main memory unit 101 is not lost. According to the present exemplary embodiment, through the above-described processing, the main memory unit that is to store data is selected on the basis of the information regarding the data source. Accordingly, leaking of confidential information can be prevented without a decrease in the processing speed.

Second Exemplary Embodiment

A technique for preventing information leakage from the information processing apparatus according to a second exemplary embodiment is described below. The present exemplary embodiment relates to a technique for swap-out control and swap-in control performed on data in a volatile main memory unit of the information processing apparatus further including a nonvolatile main memory unit. Note that description of the configurations and operations that are the same as those of the first exemplary embodiment is not repeated.

Figure 7:
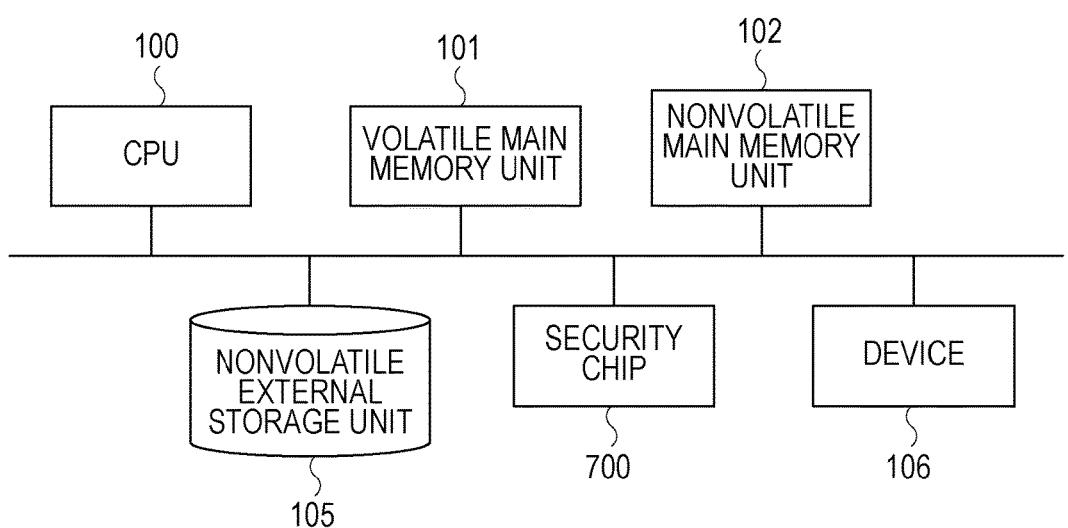
FIG. 7 is a schematic illustration of the configuration of an information processing apparatus according to a second exemplary embodiment.

FIG. 7 is a schematic illustration of the configuration of an information processing apparatus according to the present exemplary embodiment. As described above, since the configurations of a CPU 100 to a device 106 are the same as those of the first exemplary embodiment, description of the elements is not repeated.

The information processing apparatus includes a security chip 700, which is a tamper-resistant device having a cryptographic mechanism. An example of the cryptographic mechanism is a trusted platform module (TPM). Note that in FIG. 7, the cryptographic device 103 and the nonvolatile external storage unit 104 described in the first exemplary embodiment are not illustrated. However, the information processing apparatus according to the present exemplary embodiment may include the cryptographic device 103 and the nonvolatile external storage unit 104.

Figure 8:
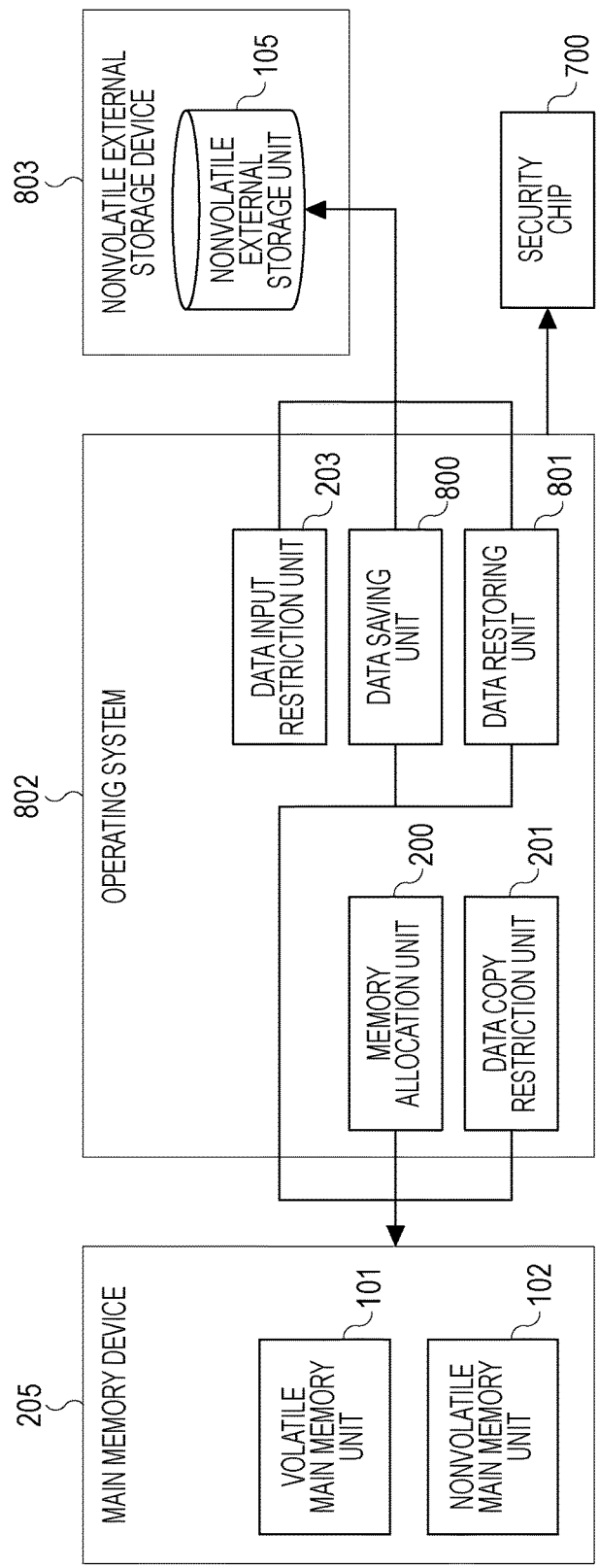
FIG. 8 illustrates the configuration of a memory management mechanism of the information processing apparatus according to the second exemplary embodiment.

FIG. 8 illustrates the configuration of a memory management mechanism of the information processing apparatus according to the present exemplary embodiment.

The memory management mechanism includes a memory allocation unit 200, a data copy restriction unit 201, a data input restriction unit 203, a data saving unit 800, and a data restoring unit 801. Each of the data saving unit 800 and the data restoring unit 801 receives a request from an operating system 802 and accesses a main memory device 205. By accessing the main memory device 205, the data saving unit 800 and the data restoring unit 801 use a volatile main memory unit 101 and a nonvolatile main memory unit 102 that constitute the main memory device 205.

In addition, the data input restriction unit 203, the data saving unit 800, and the data restoring unit 801 access a nonvolatile external storage device 803. By accessing the nonvolatile external storage device 803, the data input restriction unit 203, the data saving unit 800, and the data restoring unit 801 use the nonvolatile external storage unit 105 that constitutes the nonvolatile external storage device 803. The nonvolatile external storage device 803 may access the nonvolatile external storage unit 104 via the cryptographic device 103.

When the operating system 802 is initialized, the data saving unit 800 or the data restoring unit 801 allocates a predetermined size of an area in the nonvolatile main memory unit 102. Thereafter, the data saving unit 800 or the data restoring unit 801 registers the allocated area of the nonvolatile main memory unit 102 in the operating system 802 as a swap device.

A swap-out determination process performed by the operating system 802 is schematically described below. The operating system 802 determines the order in which pages are collected by managing the pages of data stored in the volatile main memory unit 101 using a list. The list contains the use frequency of each of the pages from the top. If the available storage capacity of the volatile main memory unit 101 becomes insufficient, the operating system 802 performs a collection process of the pages from a page having the lowest use frequency to the highest. In the collection process, if it is determined that a page is not actually used, the data of the page is to be swapped out. Thus, a swap-out request for the page is sent to the data saving unit 800.

However, if, in the collection process, it is determined that a page is actually used, the page is moved to the last entry of the list.

Figure 9:
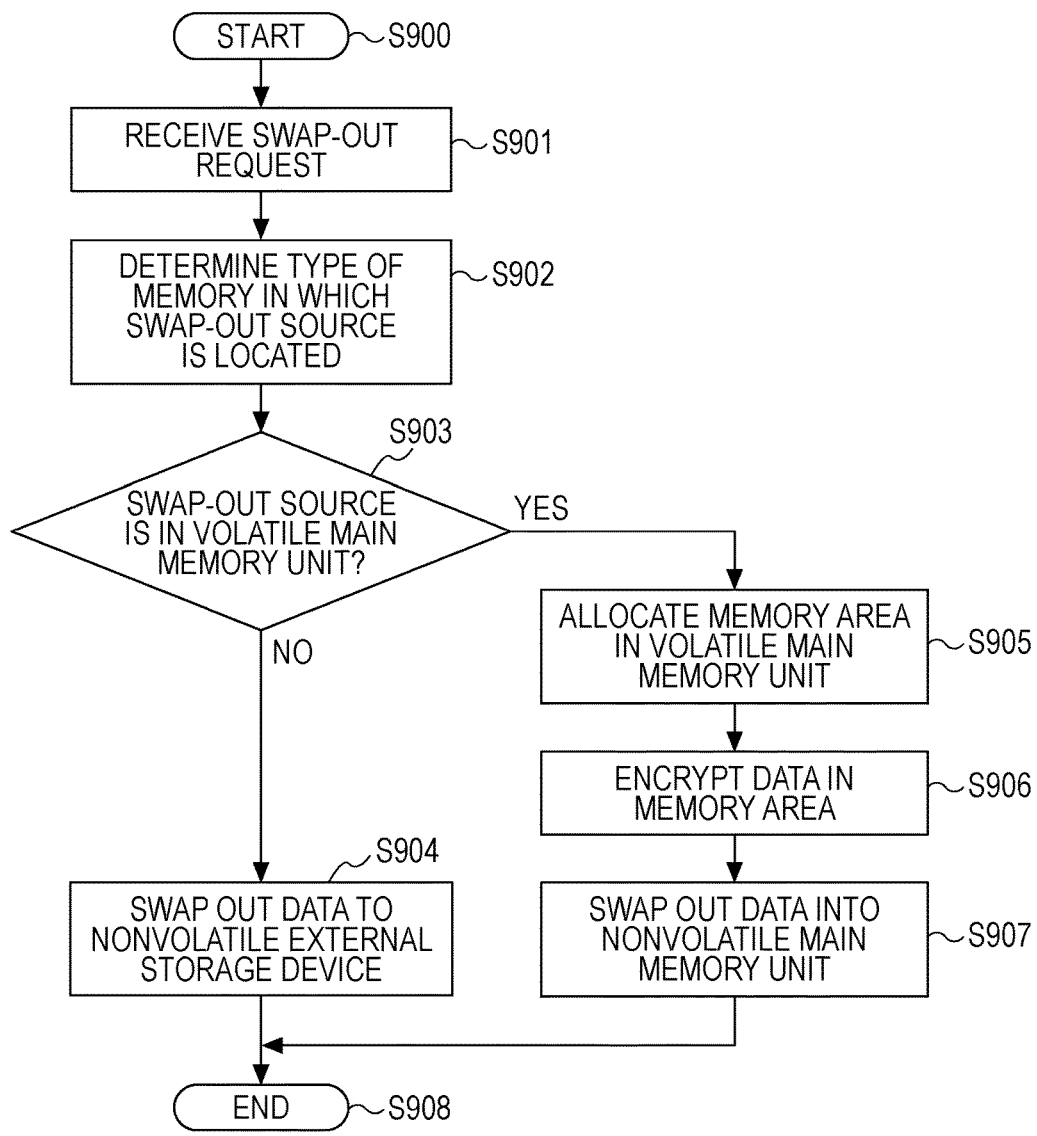
FIG. 9 is a flowchart of the process performed by a data saving unit according to the second exemplary embodiment.

FIG. 9 is a flowchart of the process performed by the data saving unit 800 according to the present exemplary embodiment and is also a flowchart of a swap-out data output process according to the present exemplary embodiment. The steps of the flowchart are described in detail below.

(step S900) The processing starts with this step.

(step S901) In step S901, the data saving unit 800 receives a swap-out request from the operating system 802.

(step S902) In step S902, the data saving unit 800 determines which one of the volatile main memory unit 101 and the nonvolatile main memory unit 102 the physical memory address of the data to be swapped out belongs to.

(step S903) In step S903, the data saving unit 800 determines whether the data to be swapped out is in the nonvolatile main memory unit 102. If it is determined that the data to be swapped out is in the nonvolatile main memory unit 102, the processing proceeds to step S905. However, it is determined that the data to be swapped out is not in the nonvolatile main memory unit 102, the processing proceeds to step S904.

(step S904) In step S904, the data saving unit 800 swaps out the data into the nonvolatile external storage device 803.

(step S905) In step S905, the data saving unit 800 allocates a memory area in the volatile main memory unit 101 in order to encrypt the data.

(step S906) In step S906, the data saving unit 800 encrypts the data to be swapped out in the memory area allocated in step S905 using a common key generated by the operating system 802.

(step S907) In step S907, the data saving unit 800 swaps out the encrypted data into the nonvolatile main memory unit 102.

(step S908) In step S908, the processing is completed.

According to the present exemplary embodiment, to use a TPM in encrypting the data, the operating system 802 allocates a memory area that is not to be swapped out in the volatile main memory unit 101 at cold boot time. Thereafter, the operating system 802 generates an appropriate common key for the allocated memory area.

The TPM encrypts the generated common key using a public key of the TPM and stores a generated descendant key of the TPM in the allocated memory area. The descendant key is used as a common key by the data saving unit 800 and the data restoring unit 801 to encrypt and decrypt data. The data saving unit 800 and the data restoring unit 801 encrypts and decrypts data using the generated common key. To generate the image of the volatile main memory unit 101, the common key needs to be encrypted and, thereafter, swap-out needs to be performed. Accordingly, the memory area storing the common key is copied to the volatile main memory unit 101. The original memory area storing the common key is changed to a target of swap-out, and swap-out is performed using the copied common key.

If boot occurs in a suspended mode, the operating system 802 allocates a memory area in the volatile main memory unit 101 and acquires the private key from the TPM. The memory area storing the common key is not subjected to swap-out.

The data saving unit 800 and the data restoring unit 801 performs swap-out and swap-in from and to even the nonvolatile external storage device 803, respectively. Since the swap-out process and the swap-in process performed on the nonvolatile external storage device 803 are the same as those of the first exemplary embodiment, descriptions of the swap-out process and the swap-in process are not repeated.

Note that encryption and decryption may be performed through a function of the TPM. In addition, the data saving unit 800 and the data restoring unit 801 may compress and decompress the confidential data when encrypting and decrypting confidential data.

The size of the swap device of the nonvolatile main memory unit 102 may be changed dynamically. The operating system 802 monitors the size of the swap device at predetermined time intervals. If the usage of the swap device is greater or equal to a predetermined size, the operating system 802 allocates a new memory area in the nonvolatile main memory unit 102 and additionally registers the memory area in the swap device. In this manner, the operating system 802 increases the size of the swap device. However, if the usage of the swap device is less than the predetermined size, the operating system 802 releases a releasable area from the swap device to reduce the size of the swap device.

Figure 10:
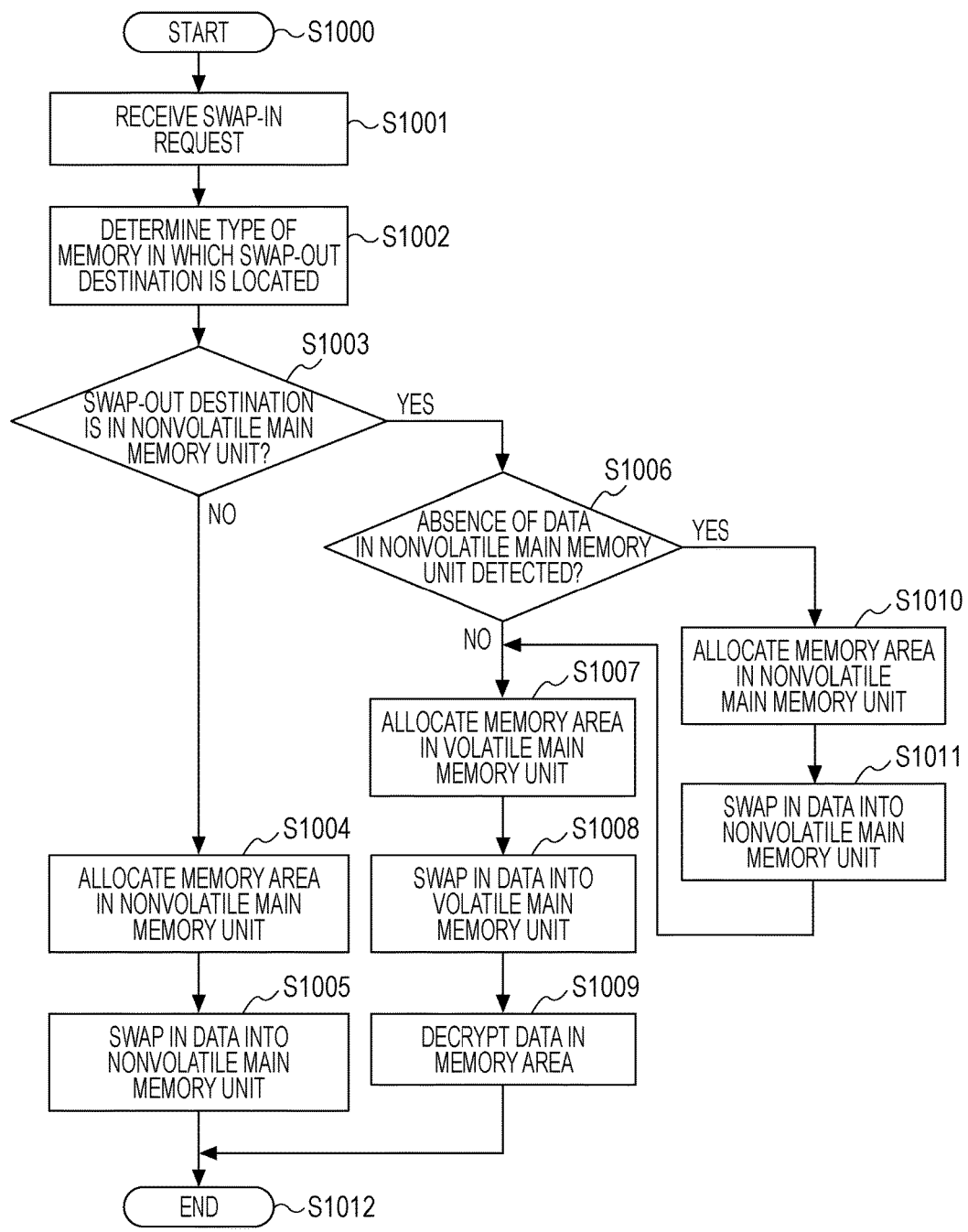
FIG. 10 is a flowchart of the process performed by the data restoring unit according to the second exemplary embodiment.

FIG. 10 is a flowchart of the process performed by the data restoring unit 801 according to the present exemplary embodiment and is also a flowchart of a swap-in data input process according to the present exemplary embodiment. The steps of the flowchart are described in detail below.

(step S1000) The processing starts with this step.

(step S1001) In step S1001, the data restoring unit 801 receives a swap-in request from the operating system 802.

(step S1002) In step S1002, the data restoring unit 801 determines which one of the volatile main memory unit 101 and the nonvolatile main memory unit 102 the physical memory address of the swap-out data belongs to.

(step S1003) In step S1003, the data restoring unit 801 determines whether the swap-out destination is in the nonvolatile main memory unit 102. If the data restoring unit 801 determines that the swap-out destination is in the nonvolatile main memory unit 102, the processing proceeds to step S1006. However, if the data restoring unit 801 determines that the swap-out destination is not in the nonvolatile main memory unit 102, the processing proceeds to step S1004.

(step S1004) In step S1004, the data restoring unit 801 allocates a memory area in the nonvolatile main memory unit.

(step S1005) In step S1005, the data restoring unit 801 swaps in the swap data from the nonvolatile external storage device 803 into the memory area allocated in step S1004.

(step S1006) In step S1006, the data restoring unit 801 determines whether the swap-out data is located in the nonvolatile main memory unit 102. If it is determined that the swap-out data is not located in the nonvolatile main memory unit 102, that is, the swap-out destination is in the nonvolatile external storage device 803, the processing proceeds to step S1010. However, if it is determined that the swap-out data is located in the nonvolatile main memory unit 102, the processing proceeds to step S1007.

(step S1007) In step S1007, the data restoring unit 801 allocates a memory area in the volatile main memory unit 101.

(step S1008) In step S1008, the data restoring unit 801 swaps in the swap data from the nonvolatile main memory unit 102 into the memory area allocated in step S1007 (the volatile main memory unit 101).

(step S1009) In step S1009, the data restoring unit 801 decrypts the data that is swapped in in step S1008 using the memory area allocated in step S1007.

(step S1010) In step S1010, the data restoring unit 801 allocates a memory area in the volatile main memory unit 101.

(step S1011) In step S1011, the data restoring unit 801 swaps in the swap data from the nonvolatile external storage device 803 into the memory area allocated in step S1010. Thereafter, the processing proceeds to step S1007.

(step S1012) In step S1012, the processing is completed.

If the swapped-out data is not needed anymore due to release of the memory area or completion of the process, the operating system 802 may discard the data located at the swap-out destination. If the confidential data is encrypted in the nonvolatile main memory unit 102 and is swapped out into the nonvolatile external storage unit 105, the data in the nonvolatile main memory unit 102 and the data in the nonvolatile external storage unit 105 are discarded.

When the information processing apparatus enters a suspended mode, the operating system 802 encrypts all the data in the volatile main memory unit 101 and swaps out the data into the nonvolatile main memory unit 102. If sufficient memory capacity of the nonvolatile main memory unit 102 is not available, the operating system 802 swaps out the data in the nonvolatile main memory unit 102 into the nonvolatile external storage device 803. When the information processing apparatus resumes from the suspended mode, the operating system 802 decrypts the data in the nonvolatile main memory unit 102 and swaps in the data into the volatile main memory unit 101. If necessary, the operating system 802 swaps in the data from the nonvolatile external storage device 803 into the nonvolatile main memory unit 102. Alternatively, if the page is requested, the operating system 802 swaps in the page. In this manner, even when the information processing apparatus is suspended with the power turned off, the data in the volatile main memory unit 101 is not lost.

As described above, according to the present exemplary embodiment, when the information processing apparatus includes a volatile main memory unit and a nonvolatile main memory unit, confidential data is managed in the volatile main memory unit. In this manner, leaking of the confidential information can be prevented.

Third Exemplary Embodiment

Figure 11:
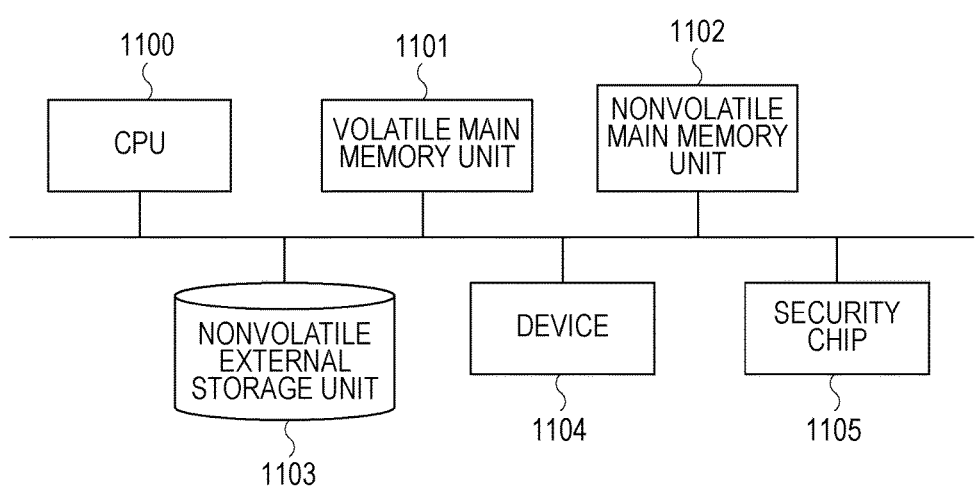
FIG. 11 is a schematic illustration of the configuration of an information processing apparatus according to a third exemplary embodiment.

FIG. 11 is a schematic illustration of the configuration of an information processing apparatus according to the present exemplary embodiment.

The information processing apparatus includes a CPU 1100 for controlling elements that constitute the information processing apparatus.

The information processing apparatus further includes a volatile main memory unit 1101 capable of storing a computer program and a variety of data. A particular example of the volatile main memory unit 1101 is a dynamic random access memory (DRAM). The volatile main memory unit 1101 can retain data as long as power is supplied thereto. In contrast, if power is stopped, the data is lost.

The information processing apparatus further includes a nonvolatile main memory unit 1102 serving as a main memory unit. Like the volatile main memory unit 1101, the nonvolatile main memory unit 1102 can store computer programs and a variety of data. The data stored in the volatile main memory unit 1101 is lost if no power is supplied thereto. In contrast, the nonvolatile main memory unit 1102 can retain data even when no power is supplied thereto. Particular examples of the nonvolatile main memory unit 1102 include a magnetoresistive random access memory (MRAM), a ferroelectric random access memory (FeRAM), a resistance random access memory (ReRAM), and a phase change random access memory (PRAM).

The information processing apparatus further includes a nonvolatile external storage unit 1103 capable of storing a computer program and a variety of data. The nonvolatile external storage unit 1103 functions as a secondary storage device. Examples of the nonvolatile external storage unit 1103 include a hard disk drive (HDD) and a solid state drive (SSD).

The information processing apparatus further includes a device 1104 serving as a peripheral device that is initialized by the CPU 1100. Examples of the device 1104 include a variety of devices, such as a PCI-connected graphic board, a USB-connected scanner, and a USB-connected printer. Note that the device 1104 may be formed by a plurality of peripheral devices.

The information processing apparatus further includes a security chip 1105. The security chip 1105 is a tamper-resistant device having a cryptographic mechanism for encrypting and decrypting data. An example of the security chip 1105 is a trusted platform module (TPM).

The CPU 1100 loads a computer program stored in the nonvolatile external storage unit 1103 into the volatile main memory unit 1101 or the nonvolatile main memory unit 1102.

Note that if the computer program has already been loaded into the nonvolatile main memory unit 1102, the need for the above-described loading process may be eliminated. The CPU 1100 fetches, from the volatile main memory unit 1101 or the nonvolatile main memory unit 1102, instructions of the computer program and performs a process.

Figure 12:
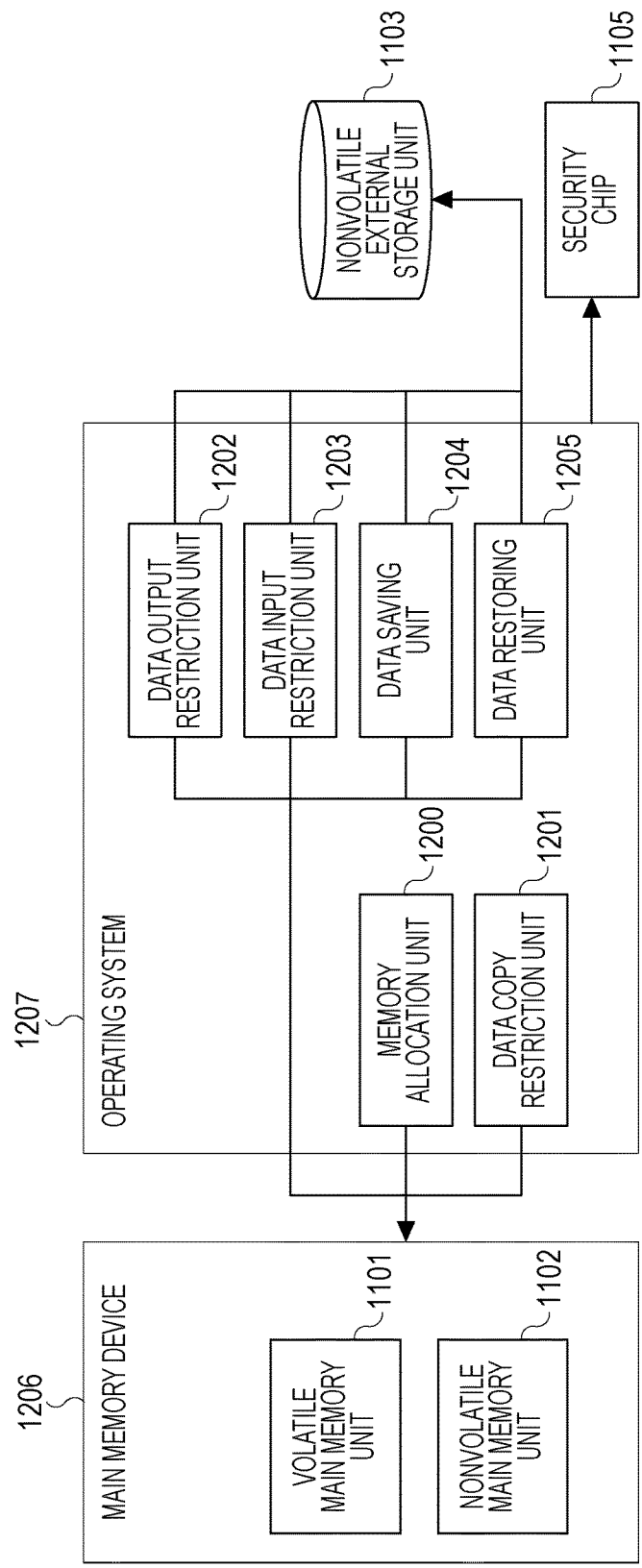
FIG. 12 illustrates the configuration of a memory management mechanism according to the third exemplary embodiment.

FIG. 12 illustrates the configuration of a memory management mechanism according to the present exemplary embodiment.

As illustrated in FIG. 12, according to the present exemplary embodiment, the memory management mechanism includes a memory allocation unit 1200, a data copy restriction unit 1201, a data output restriction unit 1202, and a data input restriction unit 1203, a data saving unit 1204, and a data restoring unit 1205. Note that the units of the memory management mechanism are formed by the control performed by an operating system 1207 and perform a memory management of the information processing apparatus.

Each of the units receives a request from the operating system 1207 and accesses a main memory device 1206. In this manner, each of the units uses the volatile main memory unit 1101 and the nonvolatile main memory unit 1102 that constitute the main memory device 1206. In addition, the data output restriction unit 1202, the data input restriction unit 1203, the data saving unit 1204, and the data restoring unit 1205 use the nonvolatile external storage unit 1103.

When the operating system 1207 is started up, a boot loader loads the operating system 1207 into the nonvolatile main memory unit 1102. The operating system 1207 performs an initialization process on the operating system 1207 itself using an area of the nonvolatile main memory unit 1102.

In addition, the operating system 1207 enables the volatile main memory unit 1101 and the nonvolatile main memory unit 1102. Thereafter, the operating system 1207 divides the physical memory of each of the volatile main memory unit 1101 and the nonvolatile main memory unit 1102 into page frames. Subsequently, the operating system 1207 associates each of the page frames with one of pages of the physical address space. To manage the pages, a management table that indicates the states of the pages including a confidential flag is assigned. The processing of data in the page is managed by using the management table. Such a memory management scheme is referred to as "paging".

Figure 13:
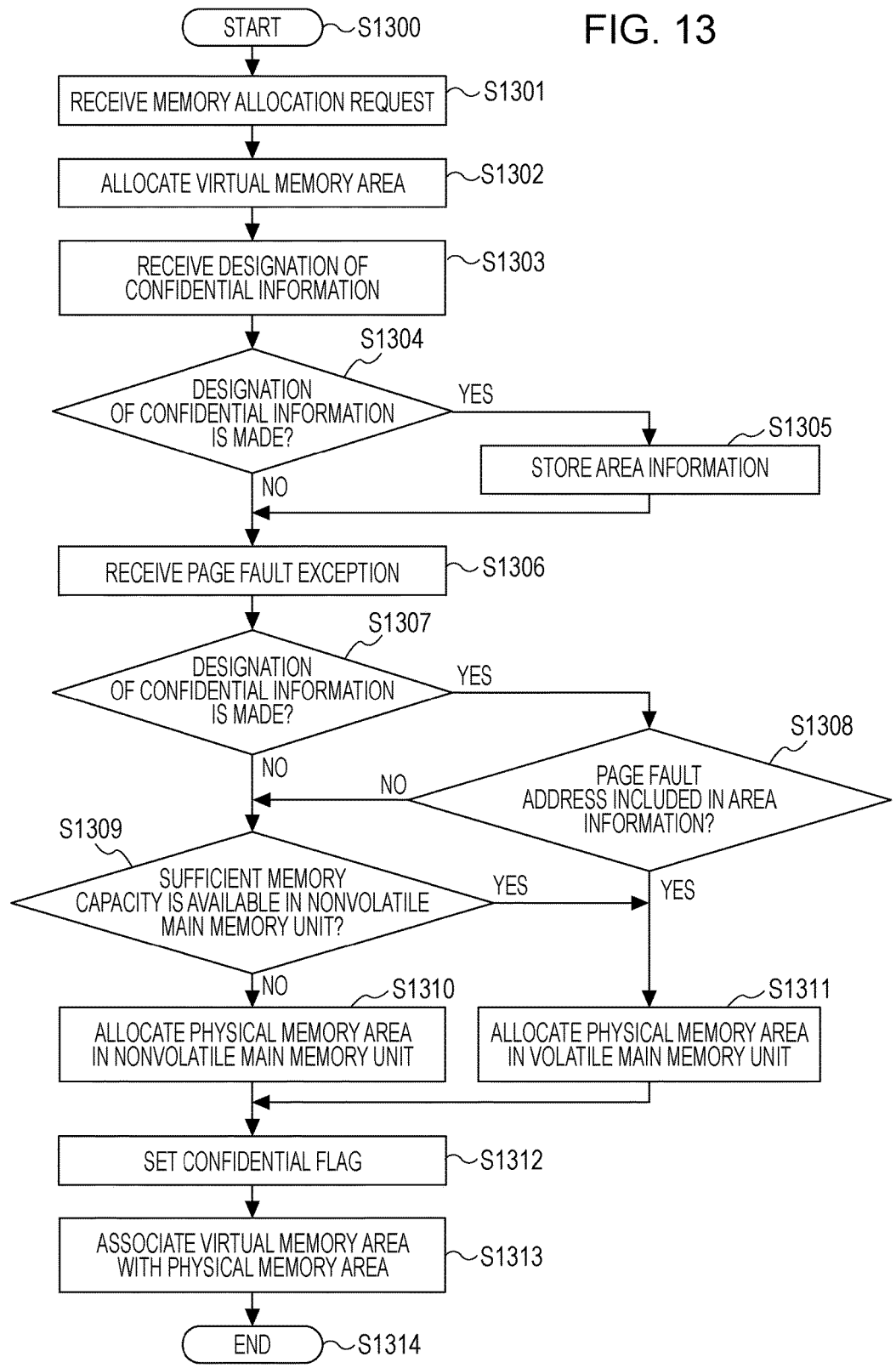
FIG. 13 is a flowchart of the process performed by a memory allocation unit according to the third exemplary embodiment.

FIG. 13 is a flowchart of the process performed by a memory allocation unit according to the present exemplary embodiment and is also a flowchart of a memory allocation process based on demand paging. The steps of the process are described in detail below.

(step S1300) The processing starts with this step.

(step S1301) In step S1301, the memory allocation unit 1200 detects that a user or a user program submits a memory allocation request thereto using a system call. The memory allocation unit 1200 receives the memory allocation request via the operating system 1207.

(step S1302) In step S1302, the memory allocation unit 1200 allocates a memory area of a virtual memory on the basis of the memory allocation request submitted in step S1301.

(step S1303) In step S1303, the memory allocation unit 1200 receives, from the user or a user program, designation of confidential information on the basis of a system call. The system call is a request for defining a virtual memory area as a confidential data area and is received from the operating system 1207. Note that to designate information as confidential information, part of the virtual memory area may be defined as a confidential data area, or the entire virtual memory area may be defined as a confidential data area. In addition, the system call may be integrated with the system call used in step S1301.

(step S1304) In step S1304, the memory allocation unit 1200 determines whether, in step S1303, designation of confidential information is made. If it is determined that designation of confidential information is made, the processing proceeds to step S1305. However, if it is determined that no designation of confidential information is made, the processing proceeds to step S1306.

(step S1305) In step S1305, the memory allocation unit 1200 stores confidential area information in the main memory device 1206.

(step S1306) In step S1306, the memory allocation unit 1200 accepts a page fault exception. If data is written to the area allocated to the user or the user program, the memory allocation unit 1200 receives a page fault exception from the CPU 1100.

(step S1307) In step S1307, the memory allocation unit 1200 functions as a control unit and determines whether, in step S1304, designation of the confidential information is made. If it is determined that designation of confidential information is made, the processing proceeds to step S1308. However, if it is determined that designation of confidential information is not made, the processing proceeds to step S1309.

(step S1308) In step S1308, it is determined whether the virtual memory address which is a target of a page fault exception is included in the confidential area information stored in the main memory device 1206. If it is determined that the virtual memory address which is a target of a page fault exception is included in the confidential area information, the processing proceeds to step S1310. However, if it is determined that a virtual memory address which is a target of a page fault exception is not included in the confidential area information, the processing proceeds to step S1309.

(step S1309) In step S1309, the memory allocation unit 1200 determines whether sufficient memory capacity is available in the nonvolatile main memory unit 1102. If it is determined that sufficient memory capacity is not available, the processing proceeds to step S1311. However, if it is determined that sufficient memory capacity is available, the processing proceeds to step S1310. Note that in the process performed in this step, to select one of the main memory units in which the memory area is to be allocated, the data transfer speeds of the main memory units may be taken into account in addition to the information as to whether sufficient memory capacity is available in the main memory units.

(step S1310) In step S1310, the memory allocation unit 1200 allocates a physical memory area in the nonvolatile main memory unit 1102. After the physical memory area is allocated, the processing proceeds to step S1312.

(step S1311) In step S1311, the memory allocation unit 1200 allocates a physical memory area in the volatile main memory unit 1101 as a confidential data area. After the physical memory area is allocated, the processing proceeds to step S1312.

(step S1312) In step S1312, if a memory area is allocated for the confidential data, the memory allocation unit 1200 sets a confidential flag. More specifically, the memory allocation unit 1200 copies the data in the original physical memory area into the new allocated physical memory area, makes a change so that the virtual memory area is associated with the new allocated physical memory, and sets the confidential flag. If the original physical memory area is not associated with another virtual memory area, the memory allocation unit 1200 releases the original physical memory area. In addition, when the physical memory area corresponding to the virtual memory area is in the volatile main memory unit 1101 and if the physical memory area is associated with the virtual memory area in one-to-one correspondence, the processing is completed after the confidential flag is set. However, if the physical memory area is associated with the virtual memory area in one-to-many correspondence, the processing is performed in a manner that is the same as in the case where the original data is in the nonvolatile main memory unit 1102.

(step S1313) In step S1313, the memory allocation unit 1200 associates the virtual memory address with the allocated physical memory address.

(step S1314) In step S1314, the processing is completed. Note that in the above-described step S1310, the memory allocation unit 1200 may directly receive, from the operating system 1207, a request for allocating a physical memory area for confidential information and allocate a physical memory area in the volatile main memory unit 1101.

Figure 14:
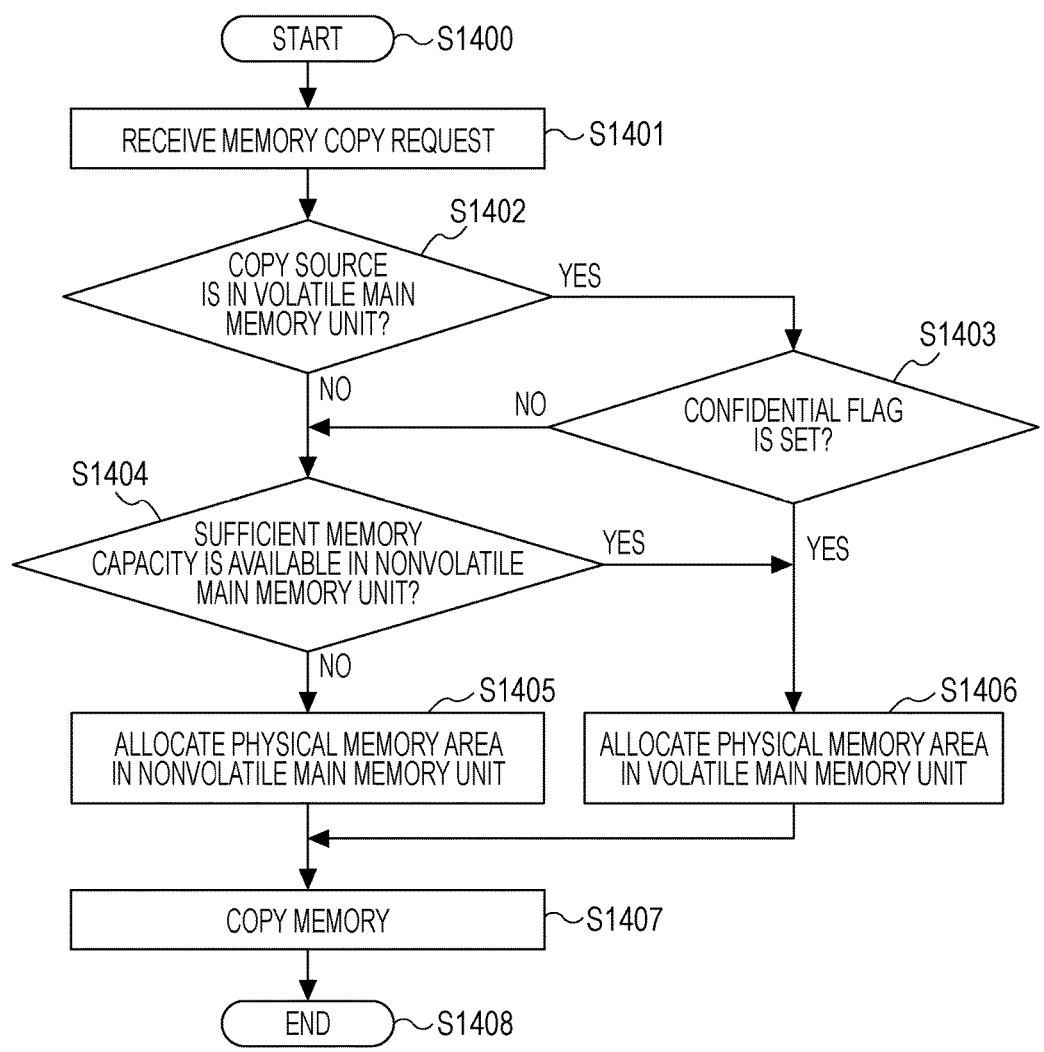
FIG. 14 is a flowchart of the process performed by a data copy restriction unit according to the third exemplary embodiment.

FIG. 14 is a flowchart of the process performed by the data copy restriction unit 1201 according to the present exemplary embodiment.

(step S1400) The processing starts with this step.

(step S1401) In step S1401, the data copy restriction unit 1201 receives, from the operating system 1207, a memory copy request for copying data in the main memory device 1206.

(step S1402) In step S1402, it is determined whether the physical memory address of the data to be copied is an address in the volatile main memory unit 1101. If, in step S1402, it is determined that the physical memory address of the data to be copied is an address in the volatile main memory unit 1101, the processing proceeds to step S1404. However, if it is determined that the physical memory address of the data to be copied is not an address in the volatile main memory unit 1101, that is, if the physical memory address of the data to be copied is an address of the nonvolatile main memory unit 1102, the processing proceeds to step S1403.

(step S1403) In step S1403, the data copy restriction unit 1201 functions as a determination unit, which determines whether the confidential flag is set for the page of the data to be copied. If the confidential flag is set, storing data in a nonvolatile storage unit needs to be inhibited. Accordingly, the processing proceeds to step S1406. However, if the confidential flag is not set, the processing proceeds to step S1404.

(step S1404) In step S1404, the data copy restriction unit 1201 determines whether sufficient storage capacity for storing the data is available in the nonvolatile main memory unit 1102. If sufficient storage capacity is not available, the processing proceeds to step S1406. However, if sufficient storage capacity is available, the processing proceeds to step S1405.

(step S1405) In step S1405, the data copy restriction unit 1201 allocates a physical memory area in the nonvolatile main memory unit 1102.

(step S1406) In step S1406, the data copy restriction unit 1201 allocates a physical memory area in the volatile main memory unit 1101.

(step S1407) In step S1407, the data copy restriction unit 1201 copies the data to be copied from the physical memory area into the new allocated physical memory area.

(step S1408) In step S1408, the processing is completed.

Through the above-described processing, the data copy restriction unit 1201 restricts copying data from one type of main memory unit to a different type of main memory unit. In this manner, confidential data and normal data do not coexist in the same main memory unit. In addition, since confidential data is managed using a flag for a page, the technique can be easily implemented in widely used operating systems that use a paging scheme, such as Linux™.

Note that in addition to the memory copy process, the data copy restriction unit 1201 performs a transfer process and a merge process in the main memory units of the same type. As used herein, the term "merge process" refers to a process in which if physical memory areas containing the same data are present, one of the physical memory area is left unchanged and the other physical memory area is released. The data copy restriction unit 1201 does not perform the merge process if two memory areas contain the same data but are located in main memory units of different types.

In addition, when normal data is written to the nonvolatile external storage unit 1103, the operating system 1207 temporarily caches the data into the main memory device 1206 to output the data so that the data has a predetermined data size. At that time, the data output restriction unit 1202 also restricts the cache output process. When the data in the volatile main memory unit 1101 is temporarily cached, the data output restriction unit 1202 allocates a cache in only the volatile main memory unit 1101 and outputs the data to the cache. Thereafter, the data output restriction unit 1202 outputs the data from the cache to the nonvolatile external storage unit 1103. In this manner, leaking of the confidential data from the volatile main memory unit 1101 can be prevented.

When the operating system 1207 or an application uses data in the nonvolatile external storage unit 1103, the operating system 1207 loads the data into the main memory device in the form of a cache. By restricting data input in the form of a cache, the data input restriction unit 1203 prevents the confidential data from leaking out of the nonvolatile external storage unit 1103. The data input restriction unit 1203 receives, from the operating system 1207, a request for loading data into the nonvolatile external storage unit 1103 in the form of a cache. If the data is encrypted by a cryptographic device or the operating system 1207, the data input restriction unit 1203 restricts caching into the nonvolatile main memory unit 1102. The data input restriction unit 1203 allocates a physical memory area in the volatile main memory unit, loads the data into the physical area in the form of a cache, and sets the confidential flag. In addition, in the same manner, the data input restriction unit 1203 restricts data input in the form of a cache from the device 1104, such as a USB storage.

When the operating system 1207 is initialized, the data saving unit 1204 or the data restoring unit 1205 allocates a predetermined size of an area in the nonvolatile main memory unit 1102. Thereafter, the data saving unit 1204 or the data restoring unit 1205 registers the allocated area of nonvolatile main memory unit 1102 in the operating system 1207 as a swap device. In addition, the data saving unit 1204 or the data restoring unit 1205 registers a plurality of areas of the nonvolatile external storage unit 1103 in the operating system 1207 as swap devices. One of the swap devices is selected as the swap device for confidential data. According to the present exemplary embodiment, it is assumed that the swap device of the nonvolatile external storage unit 1103 has sufficient available storage capacity at all times.

Figure 15:
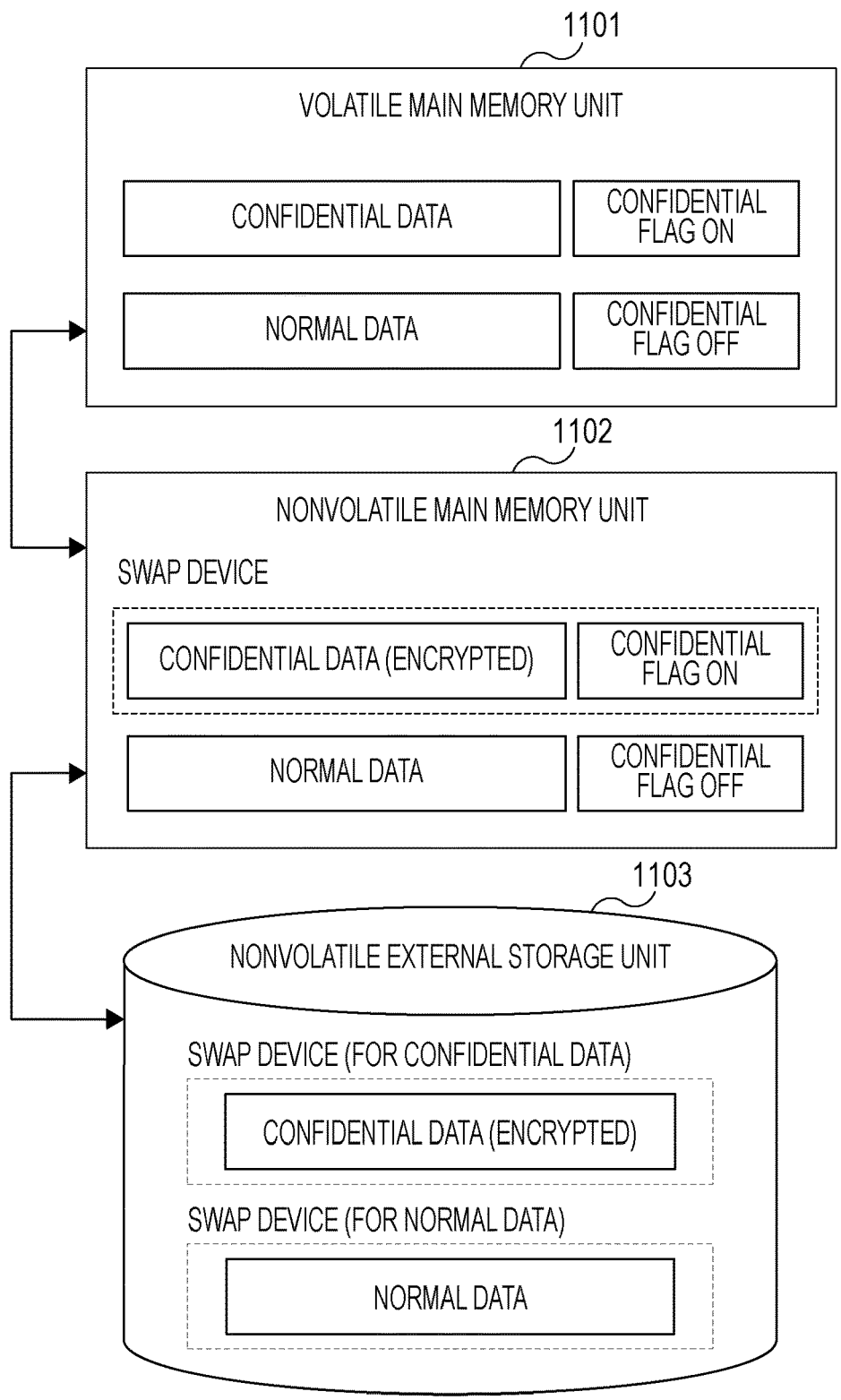
FIG. 15 illustrates the state of a flag in each of memory units that constitute the third exemplary embodiment.

FIG. 15 illustrates the state of the flag in each of the memory units.

In the main memory unit, the confidential flag is always set for confidential data and is always cleared for normal data. In the nonvolatile external storage unit 1103, a confidential flag is not provided for both confidential data and normal data. Data is transferred and swapped between the volatile main memory unit 1101 and the nonvolatile main memory unit 1102 and between the nonvolatile main memory unit 1102 and the nonvolatile external storage unit 1103. In the nonvolatile main memory unit 1102, confidential data is encrypted and stored in the swap device. In the nonvolatile external storage unit 1103, confidential data and normal data are stored in the swap device.

To perform a page collection process, the operating system 1207 requests for swap-out or swap-in to the data saving unit 1204 and the data restoring unit 1205 or performs a page movement process. This determination is made in accordance with the level of the confidentiality of the data and the state of the memory unit.

The determination regarding swap-out to the volatile main memory unit 1101 is described below. The operating system 1207 determines the order in which pages are collected by managing the pages of data stored in the volatile main memory unit 1101 using a list. The list contains the use frequency of each of the pages from the top. The operating system 1207 performs a collection process of the pages from a page having the lowest use frequency to the highest. The operating system 1207 stores the ratio of normal data to confidential data contained in the volatile main memory unit 1101. If the available storage capacity of the volatile main memory unit 1101 becomes insufficient, the operating system 1207 performs a collection process. When the page to be collected is confidential data and if the ratio of normal data to confidential data is high, the operating system 1207 determines that the data is not swapped out into to the nonvolatile main memory unit 1102, and moves the data to the last entry of the list. In contrast, when the page to be collected is confidential data and if the ratio of normal data to confidential data is low, the operating system 1207 determines that the data is swapped out into the nonvolatile main memory unit 1102. However, if the page to be collected is normal data, the operating system 1207 moves the data to the nonvolatile main memory unit 1102 regardless of the ratio of the normal data to the confidential data.

The determination regarding swap-out to the nonvolatile main memory unit 1102 is described below. The operating system 1207 also manages the pages of the nonvolatile main memory unit 1102 using a list. Note that the list is different from the list used for the volatile main memory unit 1101. When the page to be collected is normal data and if sufficient storage capacity is available in the volatile main memory unit 1101, the operating system 1207 moves the data into the volatile main memory unit 1101. In contrast, when the page to be collected is normal data and if sufficient storage capacity is not available in the volatile main memory unit 1101, the operating system 1207 determines that the data is swapped out into the nonvolatile external storage unit 1103. However, when the page to be collected is the confidential data and if sufficient storage capacity is available in the volatile main memory unit 1101, the operating system 1207 determines that the data is swapped out into the volatile main memory unit 1101. When the page to be collected is confidential data and if sufficient storage capacity is not available in the volatile main memory unit 1101, the operating system 1207 determines that the data is swapped out into the nonvolatile external storage unit 1103.

The page is moved between the main memory units by the operating system 1207. That is, the operating system 1207 copies the data to the nonvolatile main memory unit 1102 and, thereafter, deletes the original data in accordance with the flowchart illustrated in FIG. 14. The operating system 1207 determines whether the page to be collected is confidential data or normal data using the confidential flag.

If the output process to the nonvolatile external storage unit 1103 is performed at a speed higher than the decoding process, the encrypted confidential data may be swapped out from the volatile main memory unit 1101 into the nonvolatile external storage unit 1103 regardless of the available storage capacity of the volatile main memory unit 1101.

The data saving unit 1204 receives a swap-out request from the operating system 1207. If the data to be swapped out is confidential data in the volatile main memory unit 1101, the data saving unit 1204 allocates a memory area for encrypting the data in the volatile main memory unit 1101. Thereafter, the data saving unit 1204 encrypts the confidential data in the allocated memory area using the common key generated by the operating system 1207. The data saving unit 1204 allocates a new page in the swap device of the nonvolatile main memory unit 1102, copies the encrypted data and the flag of the original confidential data to the new page, and changes the virtual address. Subsequently, the original confidential data is released. If the data to be swapped out is confidential data in the nonvolatile main memory unit 1102, the data saving unit 1204 performs the following process. That is, the data saving unit 1204 outputs the confidential data to the swap device for confidential data in the nonvolatile external storage unit 1103, changes the virtual address, and releases the confidential data in the swap device of the nonvolatile main memory unit 1102. However, if the data to be swapped out is normal data in the nonvolatile main memory unit 1102, the data saving unit 1204 outputs the normal data to a swap device of the nonvolatile external storage unit 1103 other than the swap device for confidential data. Thereafter, the data saving unit 1204 changes the virtual address and releases the original normal data.

To use a TPM when encrypting the data, the operating system 1207 allocates a memory area that is not to be swapped out in the volatile main memory unit 1101 at cold boot time. Thereafter, the operating system 1207 generates an appropriate common key for the allocated memory area. The TPM encrypts the generated common key using a public key of the TPM and stores the key in a platform configuration register (PCR) register of the TPM. The data saving unit 1204 and the data restoring unit 1205 encrypt and decrypt data using the generated common key. To generate the image of the volatile main memory unit 1101, the common key needs to be encrypted and, thereafter, swap-out needs to be performed. Accordingly, the memory area storing the common key is copied in the volatile main memory unit 1101. The original memory area storing the common key is changed to a target of swap-out, and swap-out is performed using the copied common key. If boot occurs in a suspended mode, the operating system 1207 allocates a memory area in the volatile main memory unit 1101 and acquires the public key from the TPM. The TPM decrypts the common key stored in the PCR register of the TPM using the public key of the TPM. The memory area storing the common key is not subjected to swap-out.

The data saving unit 1204 and the data restoring unit 1205 may compress and decompress confidential data when the confidential data are encrypted and decrypted.

The size of the swap device of the nonvolatile main memory unit 1102 may be changed dynamically. The operating system 1207 monitors the size of the swap device at predetermined time intervals. If the usage of the swap device is greater or equal to a predetermined size, the operating system 1207 allocates a new memory area in the nonvolatile main memory unit 1102 and additionally registers the memory area in the swap device. In this manner, the operating system 1207 increases the size of the swap device. However, if the usage of the swap device is less than the predetermined size, the operating system 1207 releases a releasable area from the swap device to reduce the size of the swap device.

The data restoring unit 1205 receives a swap-in request from the operating system 1207. If the data to be swapped in is encrypted confidential data in the nonvolatile main memory unit 1102, the data restoring unit 1205 allocates a memory area for decrypting the data in the volatile main memory unit 1101. Thereafter, the data restoring unit 1205 decrypts the confidential data in the allocated memory area using the common key generated by the operating system 1207. The data restoring unit 1205 also copies the confidential flag, changes the virtual address, and releases the confidential data that was to be decrypted. However, if the data to be swapped in is confidential data in the nonvolatile main memory unit 1102, the data restoring unit 1205 allocates a memory area in the swap device in the nonvolatile main memory unit 1102 and loads the confidential data into the memory area. Thereafter, the data restoring unit 1205 sets the confidential flag, changes the virtual address, and releases the confidential data from the nonvolatile external storage unit 1103. If the data to be swapped in is normal data in the nonvolatile main memory unit 1102, the data restoring unit 1205 allocates a memory area other than the swap device of the nonvolatile main memory unit 1102 and loads the normal data into the memory area. Thereafter, the data restoring unit 1205 changes the virtual address without setting the confidential flag and releases the normal data from the nonvolatile external storage unit 1103. The data restoring unit 1205 determines whether the data in the nonvolatile main memory unit 1102 is confidential by determining whether the swap device that stores data is a swap device for confidential data.

If the swap-out data is not needed anymore due to release of the memory area or completion of the process, the operating system 1207 discards the data at the swap-out destination. If the confidential data is encrypted in the nonvolatile main memory unit 1102 and is swapped out to the nonvolatile external storage unit 1103, the data in the nonvolatile main memory unit 1102 and the data in the nonvolatile external storage unit 1103 are discarded.

The operating system 1207 may combine the plurality of swap devices in the nonvolatile external storage unit 1103 into one. In such a case, it is needed to identify whether swapped-out data is confidential. For example, a flag indicating whether the swapped-out data is confidential can be added to a swap-out page identifier that indicates the swap-out destination. Alternatively, a bit map indicating whether the data in each of the swap devices is confidential can be generated.

When the information processing apparatus enters a suspended mode, the operating system 1207 encrypts all the data in the volatile main memory unit 1101 and swaps out the data. Thus, all the normal data are moved to the nonvolatile main memory unit 1102. If sufficient storage capacity is not available in the nonvolatile main memory unit 1102, the operating system 1207 swaps out the data in the nonvolatile main memory unit 1102 into the nonvolatile external storage unit 1103. Thereafter, when the information processing apparatus resumes from the suspended mode, the operating system 1207 decrypts the confidential data in the nonvolatile main memory unit 1102 and swaps in the confidential data from the nonvolatile main memory unit 1102 into the volatile main memory unit 1101. If necessary, the operating system 1207 swaps in the data from the nonvolatile external storage unit 1103 into the nonvolatile main memory unit 1102. Alternatively, when a page is requested, the data is swapped in. In this manner, even when the information processing apparatus is suspended with the power turned off, the data in the volatile main memory unit 1101 is not lost.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-128622 filed Jun. 23, 2014 and No. 2014-128624 filed Jun. 23, 2014, which are hereby incorporated by reference herein in their entirety.

What is claimed is:

1. An information processing apparatus for processing data using a main memory device and a nonvolatile secondary storage device, the information processing apparatus comprising:
    a nonvolatile main memory unit including a main memory device;
    a volatile main memory unit including a main memory device;
    a determination unit configured to determine whether the data is designated as confidential data on the basis of a system call of an operating system;
    a control unit configured to store the data in a virtual memory corresponding to the volatile main memory unit when the determination unit determines that the data is designated as confidential data and when a copy source of the data is the volatile main memory, and store the data in a virtual memory corresponding to the nonvolatile main memory unit when the determination unit determines that the data is not designated as confidential data; and
    a swap-out control unit configured to allow the data stored in the volatile main memory unit to be swapped out into the nonvolatile secondary storage device when the nonvolatile secondary storage device is attached to a cryptographic device which encrypts or decrypts the data and reject the swap-out when the nonvolatile secondary storage device is not attached to the cryptographic device, wherein the virtual memory corresponding to the volatile main memory unit and the virtual memory corresponding to the nonvolatile main memory unit are controlled by the operating system installed on the information processing apparatus.

2. The information processing apparatus according to claim 1, wherein the determination unit determines that the data is confidential data when the data is retrieved from a memory area that is designated as confidential.

3. The information processing apparatus according to claim 1, further comprising:
    a setting unit configured to set the memory area designated as confidential.

4. The information processing apparatus according to claim 1, wherein the determination unit determines that the data is designated as confidential data when the data is retrieved from the volatile memory unit.

5. The information processing apparatus according to claim 1, wherein the determination unit determines that the data is designated as confidential data when the data is retrieved from a memory unit including a cryptographic mechanism, and
    wherein the determination unit determines that the data is not designated as confidential data when the data is retrieved from a memory unit not including a cryptographic mechanism.

6. The information processing apparatus according to claim 1,
wherein, upon swapping out the data stored in the volatile main memory unit into the nonvolatile secondary storage device, the swap-out control unit encrypt the data and stores the data in the nonvolatile main memory unit.

7. The information processing apparatus according to claim 6,
wherein, upon swapping in data stored in the nonvolatile main memory unit, the swap-out control unit decrypts the data and stores the data in the volatile main memory unit.

8. The information processing apparatus according to claim 1, wherein when the data is obtained by decrypting encrypted data, the determination unit determines that the data is designated as confidential data.

9. An information processing method for processing data by an information processing apparatus using a nonvolatile main memory unit, a volatile main memory unit, and a nonvolatile secondary storage device, the information processing method comprising:
determining whether the data is designated as confidential data on the basis of a system call of an operating system;
storing the data in a virtual memory corresponding to the volatile main memory unit when it is determined that the data is designated as confidential data and when a copy source of the data is the volatile main memory, and storing the data in a virtual memory corresponding to the nonvolatile main memory unit when it is determined that the data is not designated as confidential data; and
allowing the data stored in the volatile main memory unit to be swapped out into the nonvolatile secondary storage device when the nonvolatile secondary storage device is attached to a cryptographic device which encrypts or decrypts the data and rejecting the swap-out when the nonvolatile secondary storage device is not attached to the cryptographic device, wherein the virtual memory corresponding to the volatile main memory unit and the virtual memory corresponding to the nonvolatile main memory unit are controlled by the operating system installed on the information processing apparatus.

10. A non-transitory storage medium storing computer executable instructions causing a computer to execute an information processing method performed by an information processing apparatus including a nonvolatile main memory unit, the information processing method comprising:
determining whether data is designated as confidential data on the basis of a system call of an operating system;
storing the data in a virtual memory corresponding to a volatile main memory unit when it is determined that the data is designated as confidential data and when a copy source of the data is the volatile main memory, and storing the data in a virtual memory corresponding to the nonvolatile main memory unit when it is determined that the data is not designated as confidential data; and
allowing the data stored in the volatile main memory unit to be swapped out into the nonvolatile secondary storage device when the nonvolatile secondary storage device is attached to a cryptographic device which encrypts or decrypts the data and rejecting the swap-out when the nonvolatile secondary storage device is not attached to the cryptographic device, wherein the virtual memory corresponding to the volatile main memory unit and the virtual memory corresponding to the nonvolatile main memory unit are controlled by the operating system installed on the information processing apparatus.

11. An information processing apparatus including a nonvolatile main memory unit included in a main memory device comprising a volatile main memory device and a nonvolatile secondary storage device, the information processing apparatus storing, in the nonvolatile main memory unit, data stored using a paging scheme on a page-by-page basis, the information processing apparatus comprising:
a determination unit configured to determine whether a flag for the page indicates that the page is confidential on the basis of a system call of an operating system;
a control unit configured to inhibit the data of the page to be stored in virtual memory corresponding to the nonvolatile main memory unit when the determination unit determines that the flag indicates that the page is confidential and when a copy source of the data is the volatile main memory, and permit the data of the page to be stored in the virtual memory corresponding to the volatile main memory device when the determination unit determines that the flag indicates that the page is not confidential; and
a swap-out control unit configured to allow the data of the page to be stored in the volatile main memory unit to be swapped out into the nonvolatile secondary storage device when the nonvolatile secondary storage device is attached to a cryptographic device which encrypts or decrypts the data of the page and reject the swap-out when the nonvolatile secondary storage device is not attached to the cryptographic device, wherein the virtual memory corresponding to the volatile main memory device and the virtual memory corresponding to the nonvolatile main memory unit are controlled by the operating system installed on the information processing apparatus.

12. The information processing apparatus according to claim 11, further comprising:
a setting unit configured to set a flag for a page of the data when the determination unit determines that the flag indicates that the page is confidential and the data in the page is stored in the volatile main memory unit.

13. The information processing apparatus according to claim 11, wherein when the data in the page is stored in the volatile main memory unit and the determination unit determines that the flag indicates that the page is confidential, the control unit inhibits the data of the page to be stored in the nonvolatile main memory unit.

14. The information processing apparatus according to claim 11, further comprising:
an encryption unit configured to encrypt data,
wherein when the determination unit determines that the flag indicates that the page is confidential and the data in the page is stored in the nonvolatile secondary storage device, the control unit encrypts the data in the page using the encryption unit and stores the data in the nonvolatile secondary storage device.

15. An information processing method for use in an information processing apparatus including a nonvolatile main memory unit included in a main memory device comprising a volatile main memory device and a nonvolatile secondary storage device, the information processing apparatus storing, in the nonvolatile main memory unit, data on a page-by-page basis using a paging scheme, the information processing method comprising:

determining whether a flag for the page indicates that the page is confidential on the basis of a system call of an operating system;

inhibiting the data of the page to be stored in a virtual memory corresponding to the nonvolatile main memory unit when it is determined that the flag indicates that the page is confidential and when a copy source of the data is the volatile main memory;

permitting the data of the page to be stored in virtual memory corresponding to the volatile main memory device when a determination unit determines that the flag indicates that the page is not confidential; and allowing the data of the page to be stored in the volatile main memory device to be swapped out into the nonvolatile secondary storage device when the nonvolatile secondary storage device is attached to a cryptographic device which encrypts or decrypts the data of the page and reject the swap-out when the nonvolatile secondary storage device is not attached to the cryptographic device, wherein the virtual memory corresponding to the volatile main memory device and the virtual memory corresponding to the nonvolatile main memory unit are controlled by the operating system installed on the information processing apparatus.

16. A non-transitory storage medium storing computer executable instructions causing a computer to execute an information processing method performed by an information processing apparatus including a nonvolatile main memory unit included in a main memory device comprising a volatile main memory device, the information processing method comprising:

determining whether a flag for a page indicates that the page is confidential on the basis of a system call of an operating system;

inhibiting the data of the page to be stored in a virtual memory corresponding to the nonvolatile main memory unit when it is determined that the flag indicates that the page is confidential and when a copy source of the data is the volatile main memory;

permitting the data of the page to be stored in virtual memory corresponding to the volatile main memory device when a determination unit determines that the flag indicates that the page is not confidential; and allowing the data of the page to be stored in the volatile main memory device to be swapped out into the nonvolatile secondary storage device when the nonvolatile secondary storage device is attached to a cryptographic device which encrypts or decrypts the data of the page and reject the swap-out when the nonvolatile secondary storage device is not attached to the cryptographic device, wherein the virtual memory corresponding to the volatile main memory device and the virtual memory corresponding to the nonvolatile main memory unit are controlled by the operating system installed on the information processing apparatus.

\* \* \* \* \*